(12) United States Patent
Nimchuk et al.

(10) Patent No.: US 10,012,998 B2
(45) Date of Patent: Jul. 3, 2018

(54) TRANSPORTATION MANAGEMENT SYSTEM WITH ROUTE OPTIMIZATION TOOLS USING NON-WORK STOPS TO GENERATE TRIP PLANS

(71) Applicant: TRIMBLE NAVIGATION LIMITED, Sunnyvale, CA (US)

(72) Inventors: William George Nimchuk, Shakopee, MN (US); David Johnmichael McKinney, Richardson, TX (US)

(73) Assignee: TRIMBLE INC., Sunnyvale, CA (US)

( * ) Notice: Subject to any disclaimer, the term of this patent is extended or adjusted under 35 U.S.C. 154(b) by 56 days.

(21) Appl. No.: 15/273,403

(22) Filed: Sep. 22, 2016

(65) Prior Publication Data
US 2018/0081374 A1 Mar. 22, 2018

(51) Int. Cl.
G05D 1/02 (2006.01)
G05D 1/00 (2006.01)

(52) U.S. Cl.
CPC ......... G05D 1/0291 (2013.01); G05D 1/0088 (2013.01)

(58) Field of Classification Search
CPC .................... G05D 1/0291; G05D 1/0088
See application file for complete search history.

(56) References Cited

U.S. PATENT DOCUMENTS

2016/0109251 A1* 4/2016 Thakur .............. G01C 21/3415
705/335
2017/0262790 A1* 9/2017 Khasis .............. G01C 21/3461
2017/0349058 A1* 12/2017 Bernier .............. B60L 11/1846

* cited by examiner

*Primary Examiner* — Mussa A Shaawat
*Assistant Examiner* — Michael V Kerrigan
(74) *Attorney, Agent, or Firm* — Marsh Fischmann & Breyfogle LLP; Kent A. Lembke

(57) ABSTRACT

A transportation management system that includes tools for generating an optimized trip plan that can be updated, such as based on driver input, during implementation of a planned trip. The system includes a comprehensive trip optimization tool that generates a trip plan with fuel stop and rest stop optimization. The system includes tools calculating estimated time of arrival (ETA) and projected time of availability (PTA) for the driver, and these tools are adapted to provide the ETA and PTA for the entire trip (rather than only providing an ETA for the next stop). The system further includes tools accepting driver input and/or allowing driver manipulation of a dispatched trip plan such as using prefiltered alternatives for fuel stops or rest stops or routes, e.g., based on stored driver preferences, that may be less optimal than those in the original trip plan but still viable.

37 Claims, 8 Drawing Sheets

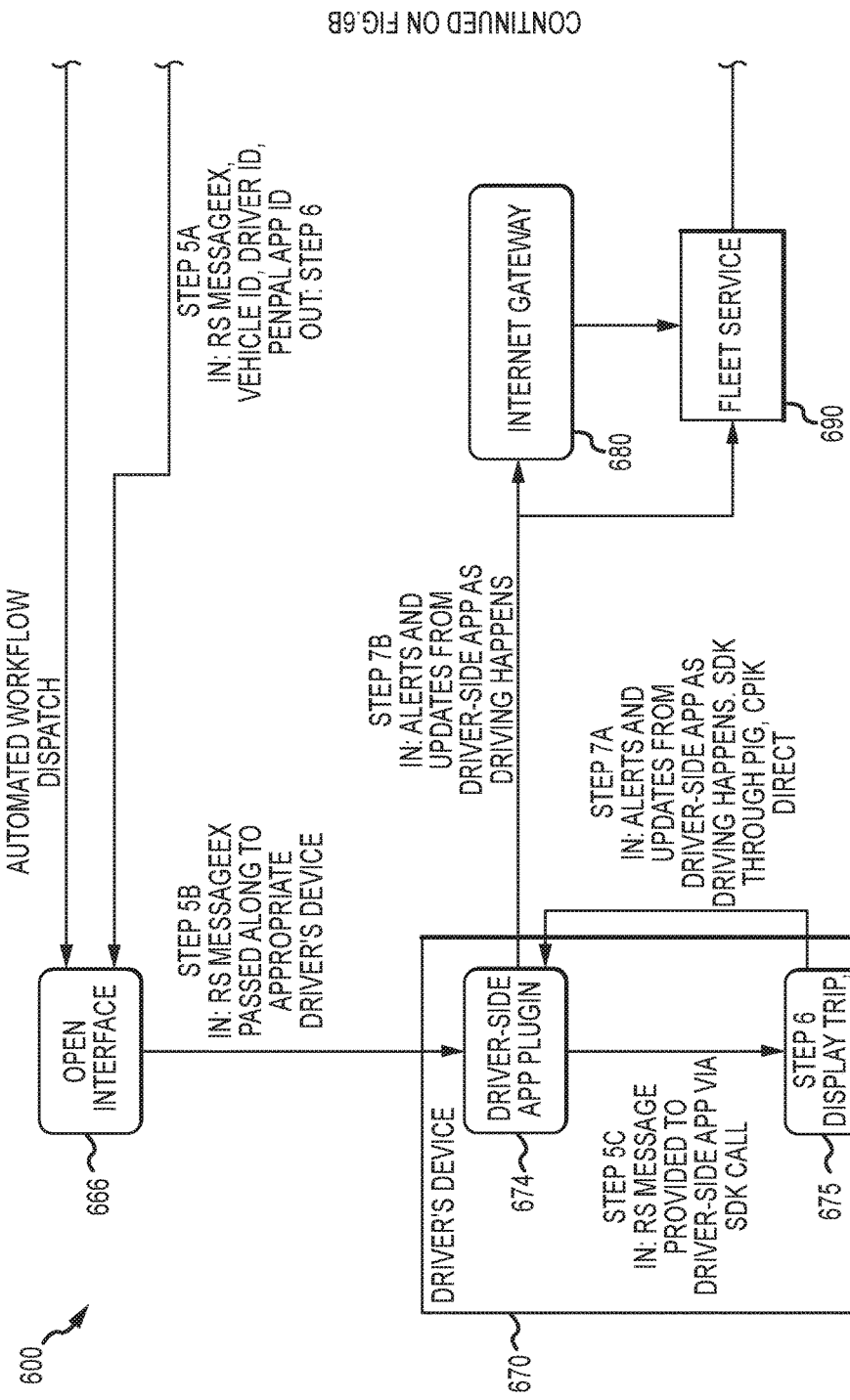

TRANSPORTATION MANAGEMENT SYSTEM WITH ROUTE OPTIMIZATION TOOLS USING NON-WORK STOPS TO GENERATE TRIP PLANS

BACKGROUND

1. Field of the Invention

The present invention generally relates to transportation management including route and/or trip planning that is useful for dispatchers and drivers in the trucking and other transportation industries and, more particularly, to a transportation management system with route (or trip) optimization tools (e.g., hardware and software) for comprehensively planning a route (or trip or trip plan) to effectively utilize available resources such as a particular vehicle and a particular driver, a driverless vehicle, a drone, and the like.

2. Relevant Background

In the trucking and other transportation industries, it is very important to effectively manage the available resources including vehicles (e.g., a truck with its tractor and trailer) and drivers, which may be considered in many cases to be the key resource of a transportation company. Transportation management has been enhanced by recent advances in telematics and associated hardware and software that allows a dispatcher or back office to have ongoing connectivity with each vehicle and driver. Transportation management software, which may include fleet or carrier dispatch software, has been developed that provides shipment planning and execution to assist transportation companies (or "carriers") in managing and growing their business by giving them visibility to costs and resources and alerting dispatchers to exceptions that otherwise may have grown into large problems. These tools combined with connectivity of the fleet and dispatcher can provide increased fuel economy, less vehicle and/or driver downtime, and higher productivity.

While many advances have been made in trip planning including route optimization, there remains a need for improved methods to maximize the efficient use of drivers as well as other resources such as the carrier's vehicles. Currently, carriers have two main alternatives in performing trip planning. The first alternative is to leave individual trip planning completely up to the driver and to rely on the driver's experience and capabilities for trip planning. However, many drivers are inexperienced or do not have these skills. Failure to plan well leads to drivers paying more for fuel than they should and driving without sufficient driving hours of service per the regulations under which they operate (which is a finable situation that could result in an out-of-service citation and/or late delivery) or parking in unsafe or unplanned locations to avoid driving without sufficient driving hours of service.

The second alternative in trip planning is more commonly used by the larger or more technically savvy carriers. This involves the back office using third party fuel optimization tools to identify the optimal fuel plan for a base route path for the trip that may or may not accurately reflect the optimal route path for the vehicle and load at the time it is meant to be run. The impact of rest stops are then estimated by using flat hour additions for longer routes (e.g., adding ten hours for the daily reset to overnight routes with "ten hours" being a non-limiting example useful for complying with current U.S. Federal Long Haul HOS regulations with it being understood that the present description is useful for complying with any country's current regulations) to provide an educated guess as to whether or not a trip plan is viable. The driver is often messaged a list of optimal fuel stops they should use, but their navigation system has little or no knowledge of the fuel plan without manual driver input, often leading to navigation route paths that do not align with the fuel plan locations. Additionally, the driver is still responsible for figuring out where and when to take their rest stops on their own without optimization or suggestions aligned with their current trip.

As a result, the drivers are presently left without the tools they need to help plan their full trip, which includes every stop and/or activity between the work stops, and dispatchers are left without insight into how required non-work stops affect the overall trip plan viability. Delays or other exceptions to the trip plan only exacerbate these problems, and this results in drivers often having to choose between driving without a plan or adding further delays to their trip while they manually re-plan the remainder of their trip.

SUMMARY

The inventors recognized that there is a need for tools to allow carriers (or other transportation companies) to plan and manage trips that make better use of their drivers as well as their trucks to enhance productivity and efficiency. To this end, a transportation management system is described that includes tools (e.g., software or algorithms implemented at the back office or dispatcher's computer system, a computer system provided in the vehicle (in a fixed or mobile device), a computer device available to the driver (such as in their mobile device or originating from their mobile device and generating optimized/alternative trips in the cloud or other wireless network before returning results to the mobile device), and so on) for generating an optimized trip plan that can be updated, such as based on driver input, dispatcher input (e.g., dispatcher may add, remove, change order, and/or update work stops in a pending or active trip), and the like, during implementation of a planned trip.

The new system includes a comprehensive trip optimization tool that generates a trip plan with optimization and viable less-optimal alternatives for non-work stops such as fuel stops and rest stops. The system also includes tools for calculating estimated time of arrival (ETA) and projected time of availability (PTA) for the driver executing the planned trip, and these tools are adapted to provide the ETA and PTA for the entire trip (rather than only providing an ETA for the next stop or failing to include all parameters for ETA or PTA calculations as in prior systems). The system further includes tools accepting driver input (and, typically, dispatcher input) and/or allowing driver manipulation (and, typically, dispatcher manipulation) of a dispatched trip plan such as using pre-filtered alternatives for fuel stops or rest stops or routes (e.g., based on stored driver preferences) that may be less optimal than those in the original trip plan but still viable (or acceptable to the carrier). In contrast, prior tools either forced the optimized plan on the driver without their input or provided no suggestions for non-work stops, leaving it up to the driver to identify options and manually determine their own full trip plan.

Briefly, the trip management system generates a comprehensive and optimized trip plan by taking in known information about the planned trip (e.g., planned work stops including appointment windows and estimated dwell time at each of these work stops) and the current or planned status of any resources involved in executing the planned trip (e.g., driver hours of service per the regulations under which they operate for the driver executing the planned trip, vehicle fuel level and fuel efficiency (e.g., miles per gallon (mpg) (or kilometers per gallon or other unit of measure) estimated or actual) for the particular vehicle used on the planned trip, and the like). The system provides the trip plan in part by generating any missing non-work stops including, but not limited to, rest stops, fuel stops, maintenance stops, and border crossings necessary to encompass the activities/actions that the driver will need to actually complete the trip plan.

The system may provide an optimal route with recommended optimized non-work stops such as rest, fuel, and maintenance stops and border crossings as well as a set of alternatives (e.g., less optimal but still valid route paths, rest stops, and fuel stops) to allow the driver to modify the trip plan prior to initiating the trip or while executing the active trip. For example, the trip plan may be configurable by the driver by stop type, e.g., Driver A may be able to manipulate any stop type while Driver B may only be allowed to manipulate rest stops (e.g., the system provides a dispatcher or other operator to set on a driver-by-driver basis which stops they can manipulate in a particular trip plan). The comprehensive trip or route plan is generated by the system so as to meet all requirements such as, but not limited to, staying within the driver's hours of service regulations while attempting to ensure the delivery windows are still met. Drivers using this system may be given the ability to manipulate portions of dispatched trip plans either through selection of alternative stop locations (e.g., replacing the planned rest or fuel stops), through manipulation of planned stop locations (e.g., reordering stops and/or altering appointment windows), or through manipulation of the planned route path (e.g., altering the series of roads to be used between stops). The system, though, will retain synchronization of the modified trip plan for all users (drivers, dispatchers, and the like) following any changes.

The transportation management system also may be configured to calculate and frequently update the ETA for every stop on a planned trip. Such updating of the ETA may be performed by the system during the trip planning stage and during actual execution of the trip plan. The updating may involve incorporation of current and historical road conditions (e.g., construction, weather, physical road conditions (e.g., wet pavement), and traffic) for the estimated driving periods and also for the estimated non-driving periods such as work, rest, or refueling periods. Additionally, the system may calculate the PTA for the driver(s) assigned to the trip plan including leveraging the comprehensive ETA calculations to identify when and where the driver will next be available for work along with a determination of how much work (i.e., hours of service per the regulations under which they operate) the driver will still be eligible to do upon trip completion.

As one useful but not limiting example, a transportation management system is provided for generating trip plans for a fleet of vehicles. The system includes a trip optimization tool on a computer system defining a set of work stops and also a vehicle operable by a driver (driver for a company with a fleet of vehicle, an independent driver, or the like). In other cases, the system may be configured for use with driverless vehicles and drones (e.g., driver input would not be received or processed and driver rest stop requirements would not need to be considered). During use of the system, the trip optimization tool generates a base route for the vehicle and the driver (or for no driver in a driverless application) including the set of work stops. The system further includes a service generating a set of non-work stops such as, but not limited to, rest stops for inclusion in the base route between two or more of the work stops based on an hours of service (HOS) status for the driver, and, during use of the system, the trip optimization tool generates a trip plan by modifying the base route to include both the work stops and the set of non-work stops such as rest stops. The system also includes a module on a device, operable by the driver, receiving the trip plan and displaying a graphical user interface (GUI) including a set of data associated with the received trip plan.

In some embodiments, the service generating the set of non-work stops such as, but not limited to, rest stops further generates a set of alternate rest stops for the base route based on the HOS status for the driver, and the set of alternate rest stops are provided with the trip plan to the device operable by the driver for display in the GUI. Then, when a driver provides user input (e.g., by defining or providing a set of preferences, by interacting with a touchscreen showing the GUI, and so on), the trip optimization tool may modify the trip plan to replace one or more of the rest stops with a driver-selected one or more of the alternate rest stops (and this may include reoptimizing other parts of the trip plan as a result of the driver's stop manipulations). In some cases, the set of alternate rest stops are selected (e.g., pre-filtered) to match a set of preferences associated with the driver for rest stops (e.g., to match desired amenities, to suit a loyalty program associated with the driver, and so on). Further, the system typically will also include a service generating additional sets of other optimized and less optimal alternative non-work stops such as fuel stops for inclusion in the base route based on operating information for the vehicle, and the trip optimization tool generates the trip plan by modifying the base route to include the work stops and non-work stops such as the rest stops, the fuel stops, the maintenance stops, border crossings, and so on replacing optimized non-work stops with driver-selected alternatives.

In some implementations, the system further includes a service calculating a projected time of availability (PTA) for the driver(s) for each of the work stops and non-work stops of the trip plan based on the driver's current and estimated future HOS status according to the regulations under which they operate, based on the estimated travel time between planned stops and estimated non-travel time at each of the planned stops, and based on the application of the set of rest stops to meeting requirements defined by the regulations under which the driver operates (assuming the driver stops at each rest stop for a defined dwell time or rest break period). In such cases or in separate implementations that may not calculate/use the PTA in the trip plan (such as driverless vehicles and drones), the system may include a service calculating an estimated time of arrival (ETA) for the vehicle at each of the work stops and the non-work stops such the rest stops, the fuel stops, the maintenance stops, and the border crossings in the trip plan. The ETAs can be calculated based on a dwell time for the vehicle estimated for each of the work stops and the non-work stops such as rest stops and fuel stops. Additionally, in some embodiments, the service generating the set of fuel stops further generates a set of alternate fuel stops for the base route. In such embodiments, the set of alternate fuel stops is provided with the trip plan to the device operable by the driver for display in the GUI, and the trip optimization tool modifies the trip plan to replace one of the fuel stops with a driver-selected one of the alternate fuel stops.

It should be understood that a particular trip might not have a defined work stop but will always have some destination (e.g. return to terminal while empty). Also, the trip might not be long enough to require a fuel stop, and it might not be long enough to require a rest stop. Further, the vehicle might not need to travel where a border crossing is necessary, and the vehicle might not have repairs that require maintenance during this particular trip. But, each of these "stops" can be considered within the system and method described herein for optimizing a trip plan. In some implementations, all work stops may be changed, reordered, added, and removed by the dispatcher (or the person handling that role regardless of title). All non-work stops may be forced upon the driver or be selectively manipulable by the driver, depending on configuration. In a driverless vehicle situation, the non-work stops would be forced upon the module operating the vehicle (rest breaks would obviously not apply, though all other non-work stops still would). Origin of a trip is either a point defined by the office system (estimated current location of the vehicle or assumed starting location of the vehicle for that trip) or by the driver (current location of the vehicle if in it, estimated current location of the vehicle, or assumed starting location for that trip) or by the mobile device (actual current location). Final destination might be a work stop, or it might be any other ending location (e.g. positioning the vehicle for its next move even though no work is to be done at that location).

BRIEF DESCRIPTION OF THE DRAWINGS

FIGS. 6A and 6B illustrate a transportation management system showing a client-side architecture and a service-side architecture during system operations to generate an optimized trip plan for use by a driver to execute a comprehensively defined trip.

DETAILED DESCRIPTION

Figure 1:
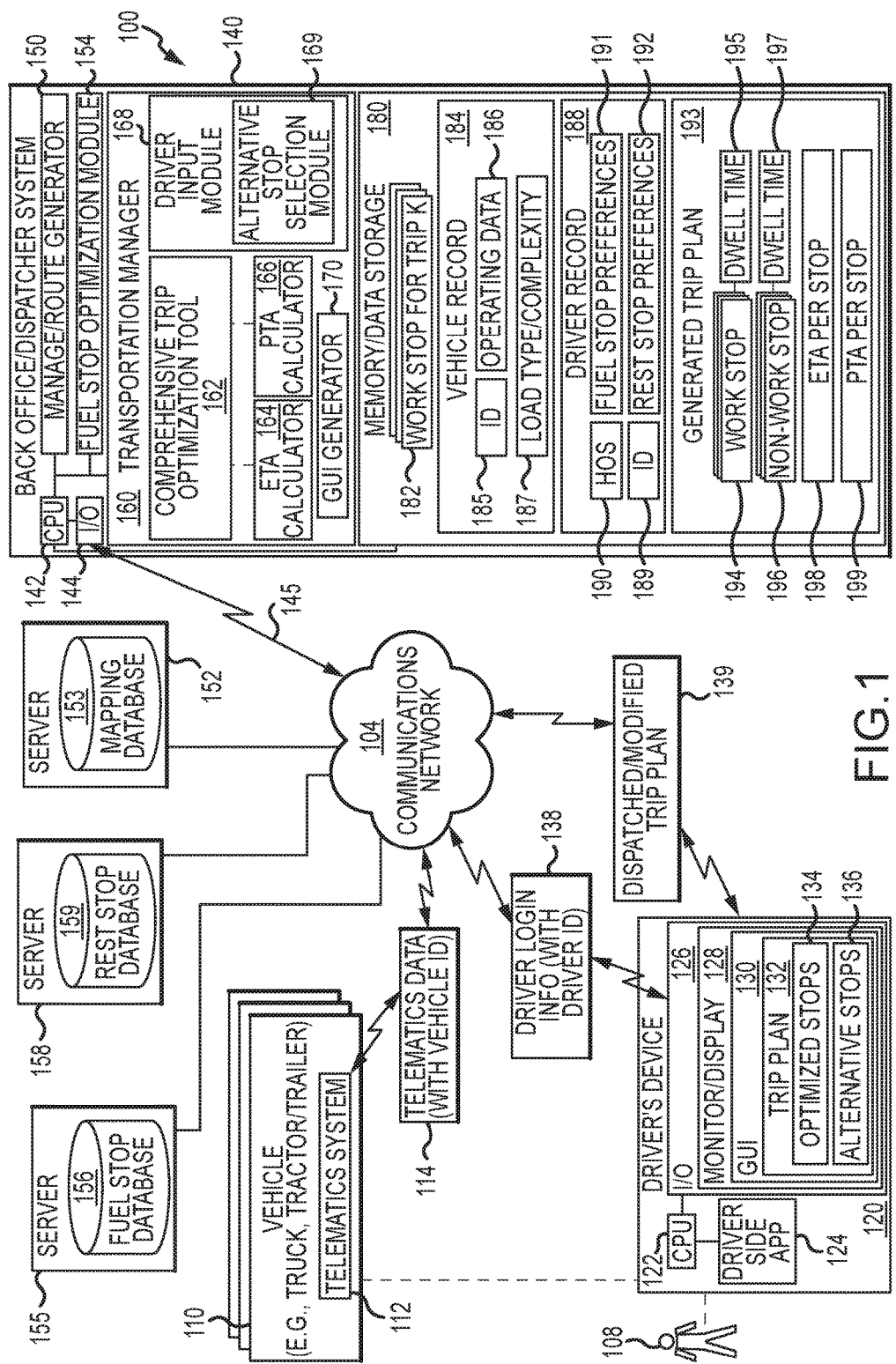
FIG. 1 is a functional block diagram of a transportation management system of the present description.

Briefly, a transportation management system is described that includes tools (e.g., software or algorithms implemented at the back office or dispatcher's computer system, run on the cloud and accessed by the dispatcher system, vehicle device(s), or driver's client device, and/or run on a vehicle-based device or on a client device used by the driver) for generating an optimized trip plan that can be updated, such as based on driver input, during implementation of a planned trip. The system includes a comprehensive trip optimization tool that generates a trip plan with fuel stop and rest stop optimization. The system also includes tools for calculating estimated time of arrival (ETA) and projected time of availability (PTA) for the driver executing the planned trip, and these tools are adapted to provide the ETA and PTA for the entire trip (rather than only providing an ETA for the next stop or failing to include all parameters for PTA as in prior systems). The system further includes a tool accepting driver input and/or allowing driver manipulation of a dispatched trip plan such as using pre-filtered alternatives for fuel stops or rest stops or routes (e.g., based on stored driver preferences) that may be less optimal than those in the original trip plan but still viable (or acceptable to the carrier such as based on input from a dispatcher or within preset ranges from the optimal stops).

With prior tools/systems, drivers were left without tools to help them plan their full trip. In contrast, the transportation management system is configured to plan for all stops the driver has to make on the planned (or dispatched) trip. These stops include non-work stops such as fuel and rest stops along with the predefined work stops. The stops may also include stops for vehicle maintenance (e.g., an oil change and the like), border crossings, weigh stations, and the like. The system provides a trip plan that includes the optimal combination of additional stops (rest, fuel, and other stops) as well as viable alternatives for the driver to select from (or accept preselected/optimized stops), which without the system the driver would have to come up with on their own. In this way, the new system improves the quality of the driver's trip plans, reduces the cost and liability of running the route while at the same time mitigating the impacts of high driver turnover (which in for-hire fleets exceeded one hundred percent in 2015 in the United States) by saving on training time for new drivers (e.g., by making trip planning automated or at least much simpler than prior methods). The system also provides greatly improved accuracy of calculations when assigning loads to drivers.

In addition to the initial optimized trip plan, the system monitors the current status of the trip and all its stops to be able to identify when current conditions (or a driver may provide user input indicating a request for a change in the trip plan such as to indicate a new/unplanned rest stop, a change in route due to traffic, and so on) cause planned stops to no longer be viable. The system then alerts the dispatcher and/or driver and allows for manual or automatic reoptimization of the remainder of the trip, which may include replacing non-viable rest or fuel stops with new optimized stops (again, with viable alternatives being provided to the driver for possible driver selection via user input by operating a truck-based or portable computing device communicating with the back office running the transportation manager (or management suite of software) or the transportation manager may be accessed via a communications network (e.g., cloud-based embodiment) or its functions may be provided on one or more devices associated with the vehicle (e.g., portable device used by the driver and/or a device(s) mounted in the vehicle)). This ensures that the driver is constantly (e.g., in a periodically updated manner) running with a valid trip plan even if, for example, an extended work stop's dwell time causes the driver to have insufficient hours of service on duty time to make it to the original planned rest stop or break location later that day (e.g., a new rest stop is provided in the updated/modified trip plan generated by the transportation management system).

Alternative or prior trip plan optimization products, in addition to being less than comprehensive, only prescribe a single solution to the driver without driver involvement or feedback. This poses a very significant and expensive problem for any carrier wanting to benefit from trip optimization on the owner operator driver (e.g., independent contractor) portion of their fleet. There have been a large number of high profile employee misclassification lawsuits from owner operator drivers against carriers who do not provide sufficient autonomy. The alternative of providing no trip plan completely leaves planning of non-work stops up to the drivers. There is no alternative to the new system described herein that provides trip plan optimization with any driver input. Fleets are forced to choose between optimization with complete back office control or complete driver autonomy with no optimization of stops.

In contrast, the system and its tools provided by the inventors provide the driver with the opportunity to contribute to the definition of their trip plan while at the same time providing an optimized trip plan for the driver to start with and modify (or accept). Viable alternatives to the optimized trip plan stops are provided to the driver (e.g., via their in-vehicle telematics devices or handheld/portable devices such as a cellphone, a tablet, a PDA, a laptop/notebook computer, or the like) along with some level of decision making support information (e.g., time and/or distance variance from the original trip plan, location-specific amenities at the stop (such as showers, parking spaces, user-based ratings of the stop and/or its facilities, and the like)). In some embodiments of the system, the driver may be allowed to provide user input to replace optimized stops with alternative stops (selected by the system as alternatives or manually entered by the driver in some cases) and/or otherwise manipulate stops or route paths both before accepting a new trip plan from the system (e.g., the central server or dispatch computing system) and during execution of the trip plan. This ensures owner operator drivers are being treated with sufficient autonomy while still being able to benefit from trip optimization provided by the transportation management system of the present description. Company drivers (e.g., those directly employed by a carrier), while not required by labor laws to have the same level of control over their work as owner operator drivers, will also appreciate and benefit from the ability to manipulate their trip plan according to their personal preferences and to meet ground reality, which will reduce driver turnover and provide greater fleet efficiency.

Prior trip planning algorithms, when calculating ETA for planning purposes, do not consider all possible impacts to the ETA result. For example, none of the prior algorithms provides an accurate accounting for all of the additional non-work stops that this system adds to the trip plan. Fuel stop dwell time is not included, for example, and rest stop periods, if accounted for at all, are simply added as 30-minute or 10-hour extensions to the ETA starting at the exact second the driver's hours of service (HOS) driving time is expected to run out, without accounting for the off-route driving time to get to a valid rest stop or the fact that a driver may have to stop at a different time before their driving time runs out in order to get a parking space (e.g., if the driver waits until HOS runs out it will be too late at many truck stops in many cities in the United States). All of these inaccuracies can lead to the ETAs of later stops being significantly off or inaccurate if, for example, the trip plan erroneously has a rest stop after a work stop when in fact the driver is required to take the rest stop before arrival to this work stop. This in turn results in either late stops (e.g., a customer service issue) or drivers continuing to drive when legally required to rest (e.g., safety and liability issues).

When calculating ETA for execution purposes, prior trip planning techniques again do not include the comprehensive features/tools of the presently described system. More significantly, though, the prior techniques do not evaluate ETA beyond the very next planned stop because they do not include estimated dwell times for stops and, therefore, cannot accurately estimate a stop's non-driving time impact to subsequent stops. This includes determining the next stop's ETA when currently stopped at the previous stop on the trip, and, hence, the prior techniques cannot estimate remaining dwell time for the current stop and, thus, cannot determine estimated departure time. As a result, users in the back office are limited in their ability to proactively manage customer service impacts caused by delays or other exceptions to the trip plan.

When calculating PTA (which defines when and where the driver will be available for more work along with how much work (HOS, which may be defined by the regulations of whichever jurisdiction or country the driver is operating their vehicle within or that otherwise apply to the driver) the driver is still eligible to do upon trip completion), the prior trip planning products again fail to include all the possible non-work stops and, therefore, produce an inaccurate ETA to the final stop on the trip as well as expected driver's availability (HOS) upon reaching that final stop. This results in inefficiencies when planning future work for the driver (either due to adding some wasted time buffer when planning future work) or having to re-plan work for the driver if a subsequent assigned trip is no longer viable once the driver completes the current trip.

In contrast, the new transportation management system calculates planned ETAs and ongoing updates to ETAs during trip execution for all stops, which include work and other stop types such as rest and fuel stops. Dwell time for each stop, as well as possible and actual road conditions such as real time and historical traffic and/or weather is included to give a much more comprehensive and accurate set of ETAs for the entire trip plan. Ongoing updates can be provided by the new system as conditions change with the vehicle or its route or with the driver. This unparalleled highly accurate set of ETAs, along with the comprehensive trip plan information, allows for an equally unparalleled highly accurate PTA for the driver to be generated by the system. The system, hence, ensures greater efficiency when planning future work for the driver while allowing for proactive responses to customer service issues that would otherwise have been unknown until too late. For example, when only two stops into a ten-stop trip, the transportation management system may be configured to alert that Stop 9 is becoming at risk of being late by comparing its ETA to its appointment window, even though the next stop (i.e., Stop 3 in this example) remains on time (which is as far out as any prior product looked).

FIG. 1 is a functional block diagram of a transportation management system 100 configured according to the present description to provide comprehensive trip optimization with driver input and manipulation and ongoing cumulative ETA and PTA calculations. As shown, the system 100 generally includes one or more vehicles 110, a set of drivers (with one driver 108 shown for simplicity), a driver's device 120 (e.g., a cellphone or other portable communication device or a computing device such as a laptop, a notebook, a tablet, a pad, or the like that often will be portable or even a handheld device) operable by the driver 108, a back office or dispatcher system 140 (e.g., any computer or computing device such as a router/server combined with one or more workstations that provide the functionality described herein), and communications network 104 (such as a wired or wireless digital communications network) communicatively linking the system components together. Note, in some implementations, the system 100 may be modified such that the system 140 is provided in the vehicle 110 for use by the driver 108 (or in a driverless application) rather than for use by a dispatcher or back office personnel.

The vehicle 110 may be any sort of vehicle used for transportation of goods, such as a truck, a tractor with a trailer (e.g., a semi-truck), or the like used in the trucking/delivery industry or by a carrier, a remotely operated vehicle or drone, or an autonomous vehicle, drone, or the like. Each vehicle 110 includes a telematics system 112 adapted for gathering information concerning operation of the vehicle 110 such as current physical location (geo-coordinates), amount of fuel, fuel efficiency on current trip, and so on. The telematics system 112 is configured to periodically communicate the telematics data to the back office/dispatcher system 140 directly or via the network 104 as shown with link 114 and with link 145 between the system 140 and the network 104. This data 114 will include the identification (ID) of the vehicle 110, which the back office system 140 can use to track or monitor its fleet and to create and modify trip plans for each truck 110 as shown with trip plan 193 generated for the vehicle 110 and its driver 108.

The transportation management system 100 includes a driver's device 120 operated by the driver 108 to communicate with the back office/dispatcher system 140 via network 104. As shown, the device 120 (e.g., a tablet, notebook, cellphone, PDA, or the like) includes a processor 122 running software and/or executing code to provide a driver-side application 124, which is adapted for communicating with a transportation manager 160 (e.g., software or code executed on the back office/dispatcher system 140) to receive and view (and interact with) a dispatched trip plan 139, for providing user input to modify the trip plan that is viewed on the device 120, and for receiving and viewing the modified trip plan 139. To this end, the driver's device 120 includes input/output devices 126 for providing the communication functions (e.g., transceivers for wireless communications over network 104) and also for displaying the received trip plan 139 and allowing the driver 108 to provide user input. The I/O devices 126 may include a monitor/display 128 (such as a touchscreen) that is operated by the driver-side app 124 to display a graphical user interface (GUI) 130 created and/or served by a GUI generator 170 of the transportation manager 160 on system 140.

The GUI 130 displays the trip plan 132, and the trip plan 132 includes a set of optimized stops 134 (work stops and non-work stops such as fuel stops, rest stops, maintenance stops, border crossings, and the like) and also a set of alternative stops 136 (e.g., different fuel or rest stops filtered to be viable by the transportation manager 160 and, in some cases, to suit the preferences of the driver 108 (viable stops may be pre-filtered based on fuel stop preferences 191 and/or rest stop preferences 192 associated with the driver 108)). During operation of the system 100, the driver 108 may interact with the I/O device 126 to choose one or more of the alternative stops 136, and these choices are communicated to the system 140 for use in modifying the trip plan to replace optimized stops 134 with the user-selected alternative stops 136 (see modified trip plan 139 being communicated to the driver's device 120).

Note, in some implementations of the system 100, the functionality shown for the system 140 are provided on the driver's device 120 rather than on a separate computing device or system as shown in FIG. 1. Further, it may be useful in some applications of the system 100 for load type and capacity to be considered as separate parameters in creating the trip plan (e.g., loads may cause differing routes/paths to be chosen, certain load types may define which routes/paths can be taken (such as hazardous waste or the like), and so on). The load type and capacity for the vehicle may be defined by a work order and not necessarily by the vehicle (e.g., hazmat is a definition of the load while total weight is a combination of a vehicle and the load), and this data would be processed to generate the trip plan.

Initially, the driver 108 interacts with the driver-side application 124 to login to the transportation manager 160, and this includes providing their ID as shown at 138, which can be used by the transportation manager 160 in retrieving the driver's record/data as shown with driver record 188 in memory 180 of the back office/dispatcher system 140. This record 188 includes the driver's ID 189, the driver's present HOS 190, and also their preferences (fuel stop preferences 191 and rest stop preferences 192), and the transportation manager 160 uses this information in generating a trip plan 193 for a particular trip. The trip 193 is planned and optimized for the driver 108 (to make better use of this resource) and also for the particular vehicle 110, and a vehicle record 184 is retrieved as shown in storage 180 by the transportation manager 160 that includes the vehicle ID 185, operating data 186 (e.g., fuel capacity and efficiency, maintenance data, and so on), and load type and capacity 187 all of which are used in generating the trip plan 193 by the transportation manager 160.

Further, as shown, the system 100 includes the dispatcher/back office system 140 that has a processor 142 managing operations of a set of I/O devices 144 for communicating as shown at 145 with the vehicle's telematics system 112 and the driver's device 120. The I/O devices 144 may also include user input devices such as a keyboard, a mouse, a touchscreen, voice recognition software, and the like for allowing an operator (a dispatcher) of the system 140 to initiate and interact (provide input) to the transportation manager 160. The CPU 142 also runs software or executes code in computer readable media to provide a map/route generator 150 and a fuel stop optimization module 154, which provide input to the transportation manager 160 in generating the trip plan 193. Particularly, the map/route generator 150 may use data from a server 152 providing mapping database 153 to generate routes between the stops chosen by the transportation manager 160 to provide optimized routes for the vehicle 110 in executing the trip plan 193 (and these may be displayed in the GUI 130 as part of the trip plan 132 on the driver's device 120). The fuel stop optimization module 154 may use data from a fuel stop database 156 provided by server 155 to generate a set of optimized fuel stops along the route created by the map/route generator 150 for the trip defined by trip plan 193 (e.g., provide the optimized fuel stops in the non-work stops 196 of the trip plan 193).

The back office/dispatcher system 140 further includes a transportation manager 160 that provides a number of the unique functions of the present description (e.g., incorporates several of the key algorithms taught by the inventors). The transportation manager 160 (e.g., a suite of one or more software applications or routines run by the processor 142) includes a comprehensive trip optimization tool 162 that generates the trip plan 193 for the vehicle 110 and driver 108. As discussed herein, the trip optimization tool 162 acts to generate a route that includes each of a plurality of work stops 182 defined for the trip as shown at 194 (each with an estimated dwell time 195). Further, though, the trip optimization tool 162 includes a set of non-work stops 196 in the trip plan 193 (again, each with an estimated dwell time 197). The non-work stops 196 include fuel stops and rest stops (and may include other stops such as maintenance stops, border crossings, and the like) optimized to make the trip more efficient for the driver 108 and the vehicle 110 and suited for the work stops 194. The set of non-work stops 196 are generated by the trip optimization tool 162 as described herein.

The transportation manager 160 further includes an ETA calculator 164 and a PTA calculator 166. These software modules or tools 164 and 166 are configured to calculate the ETA for each stop of the trip 193 as shown at 198 and the PTA for each stop of the trip 193 as shown at 199, which differs from other products that may only provide the ETA for the next stop of a trip and may fail to include all the parameters for PTA determinations used by the PTA calculator 166.

The transportation manager 160 further includes a driver input module/tool 168 that acts to generate a set of alternative non-work stops 196 with an alternative stop selection module 169, and these alternatives are included in the trip plan 139 served to the driver's device 120 and are displayed in the trip plan 132 as shown at 136. The driver input module 168 allows the driver 108 to provide input so as to select one or more of the alternative stops 136, and these are input to the trip optimization tool 162 to replace optimized stops 134 (e.g., one or more fuel or rest stops may be replaced with a driver-selected stop). The trip plan 193 is updated to include these chosen stops in the non-work stops 196, with routing/mapping also being updated as needed along with the ETAs 198 and/or the PTAs 199 based on these new stops 196. The set of alternative stops 136 may be selected from fuel stops and rest stops in databases 156 and 159 that are determined to be viable based on the work stops 194, to, in some cases, match preferences 191, 192 of the driver 108 (e.g., a rest stop with showers, a fuel stop provided by a particular company due to loyalty programs, a rest stop with a user rating above a predefined minimum, and so on), and the driver's hours of service 190 to satisfy current regulations of the country in which the trip is occurring. In some embodiments, instead of driver's preferences/needs, the preferences and/or needs of the fleet (or company operating the vehicle or contracting with the driver) are taken into consideration in defining and generating the trip plan, and these preferences may be stored in the memory 180 as a fleet preference/need record similar to that shown at 188 and/or may be provided by an operator of the system 140.

With this general understanding a transportation management system 100 and its transportation manager 160 in mind, it may now be useful to return to particular operations of such a system and algorithms implemented in the software (e.g., the manager 160) to achieve desired functions including providing an optimized trip plan that includes both fuel stops and rest stops and provides accurate ETAs and PTAs for each stop in the planned trip. The transportation management system (e.g., the transportation system 100 with its manager 160), in some embodiments, takes data and parameter inputs from a manual or integrated source, from a mobile device or back office application, or some mixture thereof. Inputs may include one or more of the following: account identification; driver name and/or identification (ID); vehicle name and/or ID; load/order identification; driver HOS current and historical data, vehicle fuel tank capacity; vehicle historical average miles per gallon (MPG)/fuel efficiency; vehicle current fuel tank level(s); combined vehicle dimensional parameters (e.g., height, weight, width, length, axles, and configuration) for routing restrictions; load specific routing parameters (e.g., hazmat type (e.g., corrosive, explosive, and so on), dimensional variations by leg as trailers are added or removed, and the like); business preference routing parameters (e.g., toll use/avoidance, ferry use/avoidance, practical versus shortest route, border crossing, and so on); road use modifiers (e.g., avoids/favors specific road segments, temporary road closures as defined by the fleet, and so on); planned stop locations and attributes (e.g., stop name, stop address, stop latitude and longitude, stop appointment window, at risk threshold, stop list order, type of stop, and the like); and trip planning preferences (e.g., driver interaction/modification levels by stop type, fuel network customization, and so on). Other inputs may include rest stop network customization, transportation manager provider-managed road use modifiers, per-leg variation in vehicle or load specific routing parameters, location-specific approach and departure path definitions, time-based entry/egress points, and multiple driver combinations (supporting team drivers).

From these inputs, the transportation manager determines the most optimal trip plan by taking into account user preferences and configurations as well as valid alternatives that the users can then select to replace stops in the original optimal trip plan. To create the optimal trip plan and/or alternatives, the transportation manager uses a variety and combination of services to identify appropriate non-work stops to insert into the original set of stops (work stops for a trip) including, but not limited to, fuel stops, rest stops (to satisfy HOS regulations), maintenance stops, border crossings, and any other stop useful to fulfill the definition of a complete trip plan. The tools of the present description also identify the optimal route path between those stops based on a combination of routing parameters, route modifications (e.g., avoid a particular road segment), and real-time or historical road speed impacts such as traffic or weather.

A set of base configurations is defined prior to each trip being optimized, and this may be performed through a mechanism made available to a back office user/dispatcher and/or may be provided via configuration settings to the driver. For example, the predefined routing profile(s) to be used by a fleet or default at risk thresholds. Then, for each trip to be planned, all necessary data is included by the source requesting the trip plan, e.g., the specific routing parameters to leverage when creating a particular trip. The base route line is determined using the existing and/or extended routing algorithms (e.g., via route generator 150 of the system 100 of FIG. 1 which may be a routing algorithm available from ALK Technologies or the like), either in a web service format (e.g., by calling web service routing APIs), on premise solution, and/or on the mobile device component. The base route (or route line) is built using routing parameters, road modifiers, trip start time, real time and historical traffic, and any other configurations or modifiers that help define the optimal route path between the initial trip stops (work stops) according to the business needs or preferences of the user.

Figure 2:
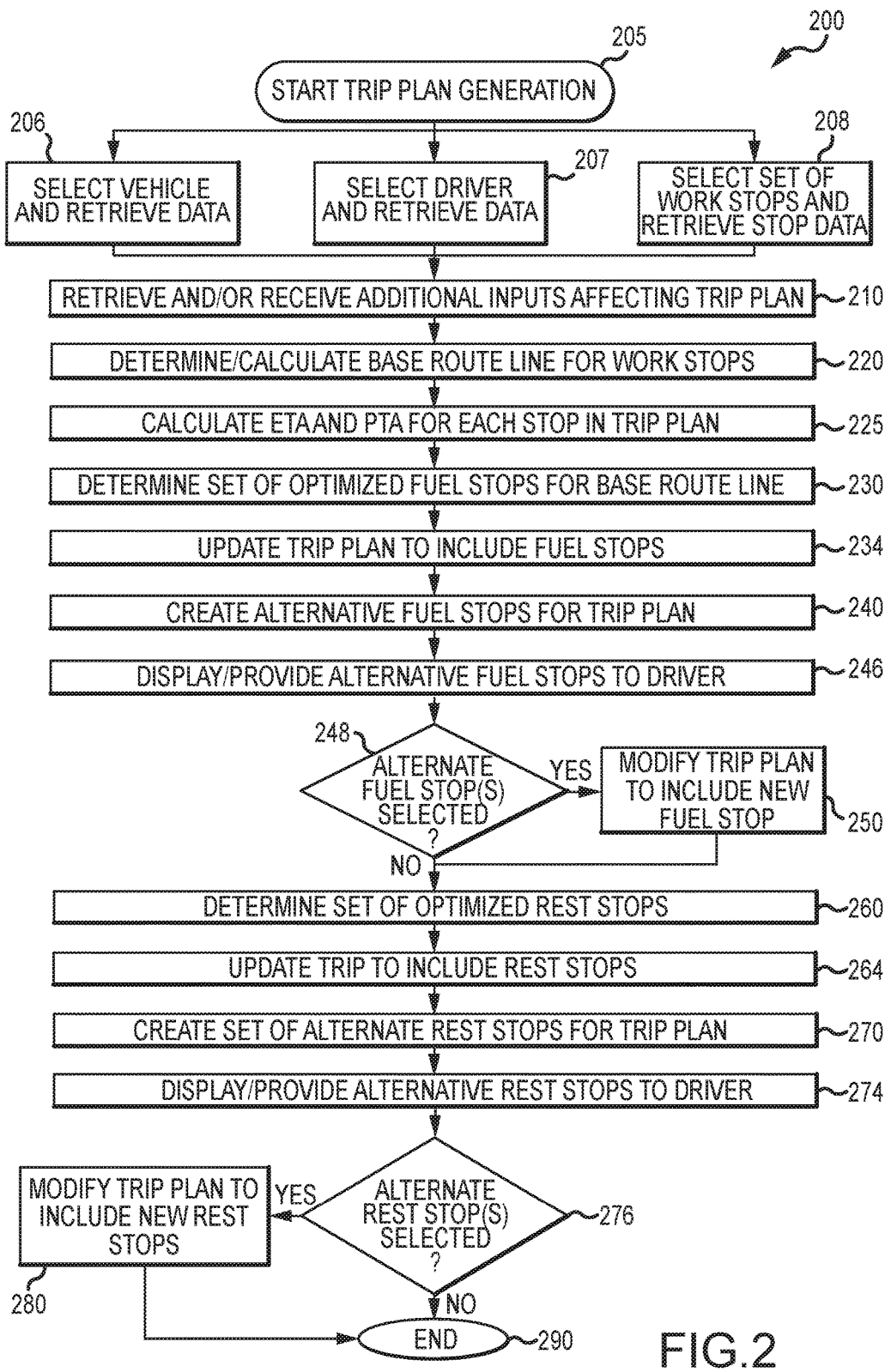
FIG. 2 is a flow diagram of a method and/or algorithm for generating a comprehensive trip plan within a transportation system such as the system of FIG. 1.

FIG. 2 is a flow diagram of a method and/or algorithm 200 for generating a comprehensive trip plan within a transportation system such as the system 100 of FIG. 1. The trip plan generation method 200 starts at 205 such as with loading a driver-side app or mobile app on a driver's portable device and providing transportation manager software of the present description on the cloud, as a web-based service or hosted application, or on a dispatcher/back office system of a carrier/fleet manager, and, at 205, the transportation manager software (or suite) is initiated by an operator (such as a dispatcher or other person assigned the task of generating an optimized and comprehensive trip plan).

At 206, a vehicle (e.g., a tractor and trailer(s)) is chosen for the trip, and its ID is used to retrieve (e.g., from a carrier database) a set of vehicle-specific data or inputs for use in generating a trip plan. The vehicle-specific inputs may include: vehicle fuel tank capacity, vehicle historical fuel efficiency or MPG rating, vehicle current fuel tank level(s), and combined vehicle dimensional parameters for routing restrictions. At 207, the method 200 includes selecting a driver for performing the trip, and their ID/name are used to retrieve (e.g., from a carrier/fleet database) driver-specific data or inputs for use in generating a trip plan. The driver-specific inputs may include: driver HOS (current and historical data) and trip planning preferences (e.g., fuel stop preferences (e.g., fuel loyalty programs), rest break preferences (showers, hot food, loyalty programs, and so on), route preferences, and so on).

At 208, the method 200 further includes selecting a set of work stops (pickups and deliveries) for the present trip. At 208, the system (e.g., the transportation system 100 of FIG. 1) also acts to retrieve additional stop or trip information including: planned load type and volume, planned stop locations and attributes (e.g., stop name, stop address, stop latitude/longitude, type of stop (pickup, delivery, and so on), stop appointment window, at risk threshold, location-specific approach and departure path definitions, time-based entry-egress for stop locations, and so on), and stop list order. The method 200 continues at 210 by retrieving and/or receiving (e.g., from fleet or online/cloud databases) additional inputs affecting or potentially affecting the present trip plan. These additional inputs may include: load specific routing parameters, business preference routing parameters, and road use modifiers.

The method 200 continues, after collection and aggregation of all needed input data/parameters, with step 220 that involves determining or calculating a base route line optimized for the work stops using the data from steps 206, 207, 208, and 210. At step 225, the ETA and the PTA is calculated for each stop in the trip plan or base route line/work stop mapping (e.g., with calculators or routines 164 and 166 of FIG. 1). Then, with this base route plan defined, the method 200 continues at 230 with determining an optimized set of fuel stops (such as with a fuel stop optimization module as shown at 154 in the transportation management system 100 of FIG. 1) for the set of work stops and base route line created so far for this trip plan. At 234, the method 200 continues with updating the trip plan (the base route plan with the work stops mapped out) to include the optimized fuel stops, and this includes repeating step 225 by calculating the ETA and PTA for each stop including the work stops and the fuel stops (or "non-work stops").

The method 200 next involves generating a set of alternative fuel stops for the present trip plan. These fuel stops may be chosen in part based on the driver preferences collected in step 207 such as loyalty programs for the driver or their company. In step 246, these alternative fuel stops are provided or displayed (e.g., via a GUI in the driver's device) to the driver along with the optimized fuel stops. The driver is able to select one or more of these alternative fuel stops or to accept the original or optimized fuel stops as part of the trip plan. At 248, the method 200 involves determining whether the driver has provided user input (e.g., via their portable device or their telematics system in their truck) selecting any alternative fuel stops. If so, the method 200 continues at 250 with modifying the trip plan to include the selected alternative fuel stops (and removing the optimized fuel stops corresponding or paired with this alternative). The trip plan is then optimized again with the new fuel stops, and this includes repeating step 225 by calculating the ETA and PTA for each stop including the work stops and the new/alternative fuel stops.

The method 200 continues at 260 with a determination of a set of optimized rest stops for the trip plan with its work stops and fuel stops defined. At step 264, the trip plan is updated to include the rest stops, and the ETA and PTA for each stop is calculated (e.g., step 225 is repeated). The method 200 continues at 270 with creating a set of alternative rest stops for the trip plan, and these may be chosen based on the driver preferences gathered in step 207 (such as for a truck stop with hot food and a rating over a predefined minimum rating or the like). At 274, the alternative rest stops are displayed or otherwise provided to the driver for selection or acceptance of the original optimized rest break stops. At 276, the method 200 includes determining whether user input was received from the driver indicating selection of one or more of the alternative rest stops. If not, the trip plan generation 200 may end at 290 such as with final dispatching of the comprehensive trip plan to the driver (to their driver's device). If one or more alternative rest stops is selected, the method 200 continues at 280 with modifying the trip plan to include the new rest stops. This includes optimizing the routes with all defined stops, and it also includes calculating new ETAs and PTAs for each of the stops in the trip plan. Then, the method 200 ends at 290 (e.g., with delivery/dispatching of the final trip plan to the driver/driver's device). Note, as discussed further herein, additional non-work stops such as maintenance stops may also be included in the trip plan, and steps may be included in the method 200 to insert these additional stops (along with ETA and PTA calculations).

To determine the optimal fuel stop(s) (e.g., step 230 in the method 200 of FIG. 2), a fuel stop optimization module (e.g., module 154 in system 100 that may use and/or build upon IDSC ExpertFuel (or its algorithms) available from TMW Systems Inc.) compares the planned route path with potential fuel locations. The module then optimizes an overall fuel plan (e.g., where to buy fuel and how much fuel to buy at each location) based off of a combination of distance along the route path, potential fuel location variance from the route path, vehicle fuel capacity/efficiency, and customer preference versus retail or customer-specific fuel rates at each potential fuel location. The module and its algorithms take in a combination of data such as the base route line, fuel capacity and average MPG for the assigned vehicle, and, in some cases, a predefined fuel network to define the optimal fuel stop solution. Sources of data for these calculations may include the calling application and other data feeds (e.g., Open Interface data feed from People-Net or the like).

To determine the optimal rest stop(s), a trip optimization tool (e.g., tool 162 in FIG. 1) may use ETA and PTA algorithms (such as calculators 164 and 166, which may build upon IDSC ETA/PTA algorithms available from TMW Systems Inc. or the like) along with routing, distance, and location algorithms (such as those available from ALK technologies or the like) to identify when and where rest breaks can most optimally be inserted into the route. The general method involves an iterative process of comparing the combined driving and non-driving time (including time affecting modifiers such as historical traffic or estimated dwell time) to each stop against the assigned driver's remaining HOS time, identifying when different types of rest breaks are required between planned stops, and then identifying the optimal location that should be used to meet the rest break requirement. This involves comparing potential locations' off route distance versus travel time variance, load-specific restrictions such as hazmat restrictions, whether the location allows for overnight parking, and other parameters such as amenities or loyalty program preference.

Figure 3:
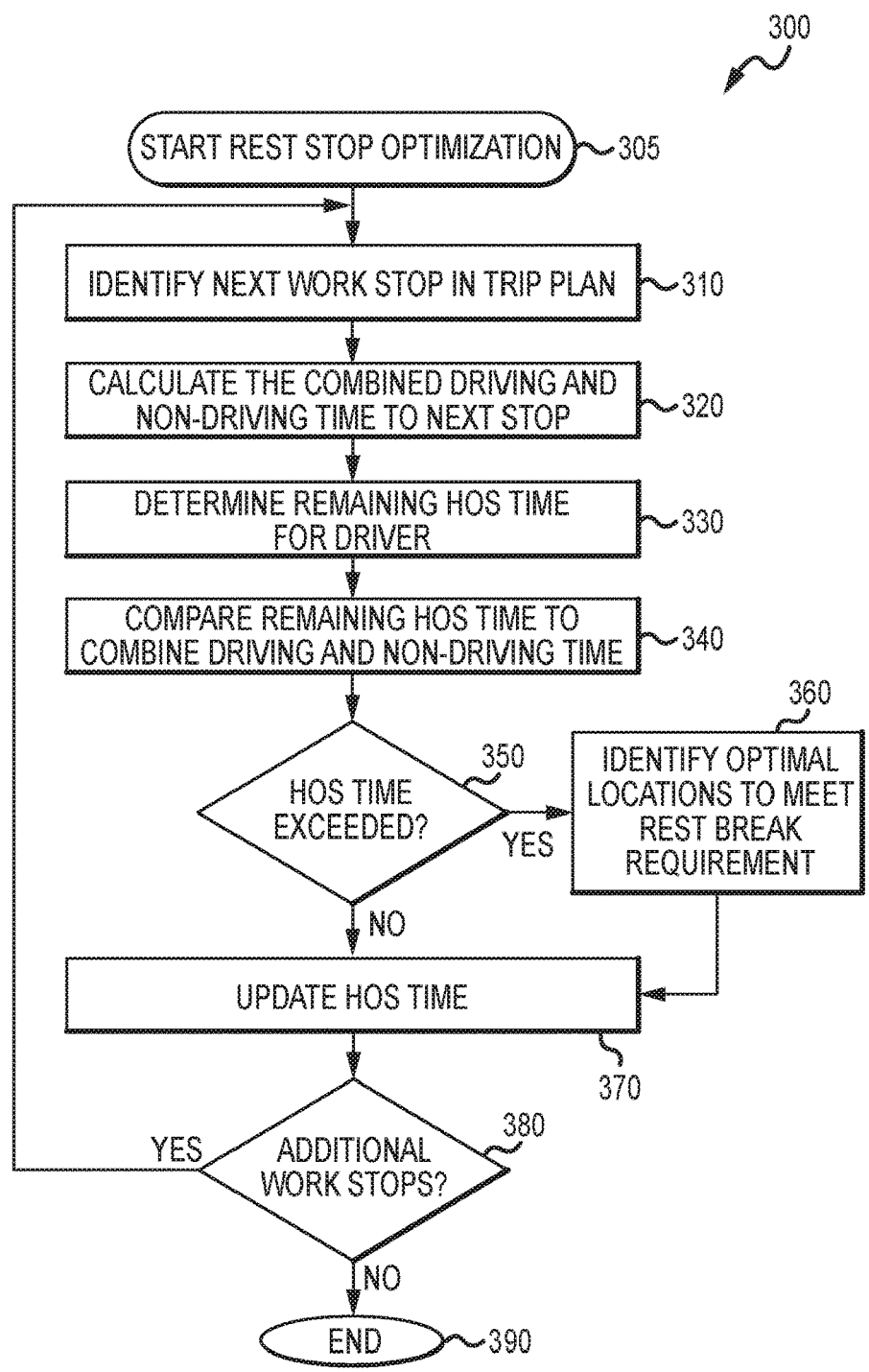
FIG. 3 is a flow diagram of a method and/or algorithm for generating a set of rest stops selected to optimize or suit a particular trip plan.

FIG. 3 illustrates a method 300 for generating a set of rest stops for a driver to optimize or improve a trip plan while meeting rest break requirements for the driver (e.g., federal regulations for short breaks (e.g., 30-minute breaks during day) and for long breaks (e.g., 10-hour breaks between driving days/periods)). The method 300 may be performed by software adapted for providing a comprehensive trip plan such as the comprehensive trip optimization tool 162 of the system 100 in FIG. 1. The method 300 starts at 305 such by initiating the rest stop subroutines or application when called from the trip plan generation routine or application (e.g., when called to perform step 260 of method 200 in FIG. 2).

Method 300 continues at 310 with identifying a next stop in the trip plan. At 320, the method 300 includes calculating the combined driving and non-driving time from the present stop to this next work stop. The driving time includes consideration of modifiers such as historical traffic while non-driving time includes estimated dwell times prior to the next stop. At 330, the method 300 includes determining the remaining HOS time for the driver at this point in the trip plan. Then, at 340, the combined driving and non-driving time is compared to the remaining HOS time.

At 350, a determination of whether or not the HOS time is exceeded prior to reaching the next stop. If yes, the method 300 includes at 360 identifying an optimal location before the next stop to meet the rest break requirement, which is first determined to be a short break or long break (e.g., in step 340 or 350). As discussed above, this may involve identifying a set of potential rest break locations on or near the route to the next stop and then comparing the potential locations' off route distance versus travel time variance, checking for load-specific restrictions for the break location (such as if the load is hazmat or exceeds a weight limit), determining whether the location allows overnight parking (for a long break), and/or determining whether the location meets the driver's preferences (such as having particular amenities or belonging to a loyalty program).

Then and when the HOS time is not exceeded, the method 300 continues at 370 with updating the driver's remaining HOS time (e.g., to reflect the break as being taken or by subtracting the combined driving and non-driving time to the next stop). The method 300 continues at 380 with determining whether there are additional stops in the trip plan. If not, the method 300 ends at 390, and, if there are more stops, the method 300 continues at step 310.

The software described herein (e.g., the trip optimization tool 162 in FIG. 1) then inserts these optimized rest breaks into the trip plan to iteratively build the final optimized trip plan while calculating accurate ETAs and PTAs for each stop within the trip including the newly added rest breaks or stops. This may be done using an integrated web service format, a mobile solution, and/or an on premise solution. The software takes in as input a combination of data such as: the driver's HOS status both now (or last known) or as expected when the trip is scheduled to start as well as the historical HOS data for more accurate calculation of future HOS availability; estimated drive time to reach already planned stops (historical or real time traffic based), which may involve leveraging impacts of weather, road conditions, and other variable historical and real time road segment average speed modifiers; estimated non-driving time for already planned stops; and a predefined rest stop network or rest stop attribute preference weightings. Sources of such data may include the calling application and data feeds (such as Open Interface provided by PeopleNet).

In addition to these two types of non-work stops, other stop types may be inserted into the optimal trip plan. For example, a need for an oil change or other maintenance for the vehicle may be determined by the tools of the present description and inserted into the trip plan as a vehicle maintenance stop. Another example may be a determined need for a medical review of the driver in order to renew the driver's commercial driver's license (CDL), and a medical clinic stop (e.g., a medical clinic that allows truck parking on or near the base route) may be added to the trip plan between work stops.

After the optimized trip plan is dispatched to the driver or vehicle (e.g., for driverless vehicles) and execution begins (the trip moves from a planning state to an execution (or in progress) state), any needs for updated rest, fuel, or other non-work stops to be provided in the trip plan will use real time data (if available). This data may be sourced from either the mobile application (on the driver's device or the telematics system in the vehicle) itself or the mobile application's integration with third party software. If real time data is not available, the transportation management system is configured to fall back to using the source(s) used for initial trip plan creation. The trip update process is very similar to the initial trip plan creation process. Two differences include the preferred use of real time data and the reoptimization of only the remainder of the trip plan, which will then be merged with the already-completed portions of the trip plan. Updates to the trip plan during execution can be required due to a user-defined change in the work stop parameters or order (e.g., a new appointment window, adding a new pickup to the trip plan, and so on) or due to events causing the initially planned stops to become invalid (e.g., delays cause a rest stop to be unreachable within available HOS driving time). Thus, a manual or automatic event-based trigger for reoptimization is supported in order to ensure validity of the active trip plan.

The initial trip plan generated by the transportation management system is intended to provide a comprehensive optimized trip plan. However, drivers will want (e.g., a company driver) or need (e.g., an owner operator driver) the option to be able to alter this optimized trip plan (initially dispatched to the driver via their client/portable device(s)). The system described herein allows users with appropriate administrative rights to configure how much each driver can manipulate the trip plan (if at all). Assuming the driver assigned to the trip plan has been configured to be able to manipulate the trip plan, alternative stops will be provided to that driver (e.g., by the transportation manager suite as shown in FIG. 1). For example, for both initial trip plan creation as well as subsequent updates during trip plan execution, alternative rest and fuel stops are identified by the corresponding optimization sub-services (or tools within the software suite providing transportation management). In a particular example, in addition to the most optimal location for a 30-minute rest break, the services may also identify alternative rest areas and truck stops that the driver could potentially select to meet their 30-minute rest break requirement that are valid (e.g., ETA to that alternative rest stop location would still be prior to the time at which the driver would run out of HOS driving time and the alternative sop location is within a configurable time and/or distance of the optimal route path). The general method to determine alternatives is very similar to optimal stops as it includes the complete list of potential rest or fuel stops that were then filtered out when generating the optimized trip plan.

Alternatives to the optimized trip plan stop locations are sent to the mobile application on the driver's device (or telematics system) along with the trip plan package or on an as-needed basis (e.g., when requested by the driver via the GUI displaying the optimized trip plan). In some embodiments, the mobile application is configured to identify the alternative stops and provide them to the driver. Prior to accepting the initial optimized trip plan, the driver may choose to manipulate the trip plan within their configured allowances. Additionally, during trip execution, the driver may choose at any time to manipulate the trip plan within their configured allowances. Any changes made are populated through the transportation management system such that all users viewing the trip are aware of the changes made and any subsequent impacts, positive or negative, they may have on the work stops.

During both the initial trip planning stage and the subsequent execution stage, ETAs are calculated to all stops on the trip, e.g., with the ETA and PTA calculators 164, 166 of FIG. 1, which may combine estimated or actual trip start time, estimated road speeds for each road segment along the planned route path during the expected driving periods (e.g., based on real time and historical traffic as well, in some cases, weather, construction, and other variables), and estimated non-driving times at each planned stop in the comprehensive trip plan. During trip planning, these calculations can be done in a cloud application, in a hosted environment (e.g., at the dispatcher system), or by the mobile application on the driver's device. During execution (i.e., all points in time after the initial trip plan is delivered to the mobile application), these calculations may be handled by the mobile application based on real time source data available on the mobile application, by linked third party mobile partner application, a central server, or a hosted environment (and with real time data or less than real time data, in some cases). Note that for each ETA there is a corresponding ETD (estimated time of departure), which is in essence the ETA plus the estimated dwell time for that stop.

The ETAs/ETDs for all remaining stops are calculated in the above manner in a frequent periodic and ongoing basis during trip plan execution such that there is little latency in identifying changes in stop status, e.g., from On Time to At Risk or from Late to On Time. Corresponding alerts may be triggered and transmitted by the transportation manager for important predefined events and exceptions to a set of defined recipients (e.g., email recipients, through web services, text messages, and so on). In addition, whenever changes are made to the trip plan, whether through user modifications such as changing a planned rest stop or adding a new work stop or through environmental changes such as a new traffic incident or unplanned dwell time at a prior work stop, all remaining stops' ETAs/ETDs are calculated in the system such as by the mobile application, the transportation manager, or other components within the transportation management system (e.g., in the manner described above).

Significant changes (which can be defined by the system users such as by dispatchers as 5 minutes or more or the like) to stop ETAs/ETDs identified within the system (e.g., by the mobile application) in addition to changes in stop statuses are communicated through the transportation management system such that all users viewing the trip information see accurate ETAs/ETDs and statuses for all remaining stops on the trip, in addition to the actual stop arrival and departure times for all completed or in progress stops on the trip.

PTA calculation is an HOS extension to the above ETA calculations, based on how the planned driving or non-driving time used to calculate ETAs is expected to count against the driver's HOS time remaining counters. For example, all driving time is counted by the system against the driver's On Duty Driving status time available, while all time from when the driver starts their day counts against the driver's maximum hours (e.g., 8 hours) before they must take a break for the day (e.g., a 30-minute break per U.S. federal regulations or a time period as defined by other regulating bodies such as the European Union). Initial trip plan PTA may be calculated by the system within an ETA/PTA service (e.g., to implement the ETA and PTA calculators 164, 166 of FIG. 1) while updates to that value may be calculated by the mobile application (e.g., driver-side app 124 in FIG. 1), based on real time HOS data (e.g., sourced from a mobile partner application (such as those available from PeopleNet)) and the different types of stops and events remaining in the trip plan.

For example, the mobile partner application may determine that there are 45 minutes remaining until the driver must take their next 30-minute break. The present system's mobile application (e.g., driver-side app 124) may determine that there are 41 minutes remaining of drive time (e.g., based on real time and historical traffic and other impacts to average road speeds) until the vehicle is expected to reach the next planned 30-minute rest stop location. This means that the planned rest stop location is still viable (e.g., driver has 4 minutes of On Duty Driving duty status time available as the interim PTA for that particular planned rest stop location). The same concept holds true for the full trip plan and the final PTA for the driver. In some embodiments, the PTA calculation may be moved partially or entirely into alternate service, hosted applications, or the mobile application on the driver's device, and it may support more than just a single active trip (e.g., allowing for multiple future trips to be planned) or multiple drivers and orders within one or more trip plans. As with ETAs, changes to the PTA are communicated throughout the transportation management system such that all users viewing the trip see current and accurate PTA values.

With the above discussion of exemplary transportation management systems and related methods/algorithms in mind, it may be useful at this time to provide several working examples of use of this new system by a carrier or other similar user.

When reviewing a trip plan dispatched from the back office or dispatcher's computer system running the software described herein while executing a trip, a driver often will want to quickly be able to see if any of the remaining stops are at risk or late. This requirement or desired functionality covers the reviewing of current status, not the change in status from at risk to on time or vice versa (which would be covered under an example answering the question "did delivery windows change to be at risk or late?").

In this example, the pending (incomplete) stops are readily differentiated within the following categories: (1) Early Stops which includes stops that, when comparing the ETA to the delivery window, are estimated by the system to have an arrival time prior to the earliest delivery window time (for example, on a 1 to 3 pm delivery window with a 15-minute at risk threshold, the driver's ETA is 12:30 pm or a half hour early); (2) On Time Stops which include stops that, when comparing ETA to a delivery window are estimated to have an arrival time between the earliest delivery window time and the start of the at risk period, e.g., latest delivery window time minus at risk threshold (for example, on a 1 to 3 pm delivery window with a 15-minute at risk threshold, the driver's ETA is 1:30 pm so right on time); (3) At Risk Stops which are stops that, when comparing the ETA to a delivery window, are estimated to have an arrival time within the risk threshold or, in other words, they are not yet likely to be late but are within a threshold of risk and, thus, are deemed to be at risk of becoming late (for example, on a 1 to 3 pm delivery window with a 15-minute at risk threshold, a driver's ETA is 2:50 pm so still technically within the delivery window but at risk of being late); and (4) Late Stops which are stops that, when comparing the ETA to the delivery window, are expected to have an arrival time beyond the last acceptable arrival time per the delivery window or, in other words, the driver is expected to be late (for example, on a 1 to 3 pm delivery window with a 15-minute at risk threshold, a driver's ETA is 3:30 pm or half an hour late).

The driver would benefit greatly from seeing just how early/late the stops that are deemed to be early or late are estimated to be, and the system provides this information by default on a driver's device (in-truck or portable/handheld device) or it can be provided upon request (e.g., through a GUI to the transportation manager or transportation management suite). For example, a driver is provided information that lets the driver know if he is going to miss a delivery window by a small amount such as 5 minutes, which can be made up in the next several hours before the delivery/work stop or by a much larger amount such as 2 to 3 hours, which cannot be reasonably made up in the remaining time (such as next 30 minutes). Such notice of the estimated magnitude of "earliness" or "lateness" are desirable in many cases, but it is likely the visibility (e.g., through a GUI provided to the driver in their client device) to the expected status (of early, on time, at risk, and late) to each work stop may be useful on its own as provided by the presently described transportation management system.

In another working example, the system is configured to, when determining the ETA for all stops on a trip, account for the time not moving at previous stops. Regardless of the stop type, the system calculates a stop's ETA by including all prior stops' estimated dwell times. For example, when the system calculates the ETA for Stop 2 in a trip plan, the estimated dwell time for Stop 1 (prior stop), which has not yet been reached by the vehicle, is added to the estimated drive time for the planned route path between the current location of the vehicle and Stop 2. Stops 1 and 2 with their dwell times affect Stop 3's ETA and so on for the entire trip plan.

If the vehicle is at a stop that is currently arrived at but not yet departed and if that stop was not arrived at early, the system uses the remainder of the estimated dwell time for the current stop to calculate the ETA of later stops of the trip plan. The remainder in this case is the difference between time spent at the current stop (as defined by arrival time through current time) and the estimated dwell time for the current stop (not to subtract below zero). In a first example of this concept, if the estimated dwell time for this stop is 30 minutes and the vehicle arrived 22 minutes ago, the system determines that 8 minutes of estimated dwell time remain, and these 8 minutes are included when calculating the next stop's ETA. In a second example of this concept, if the estimated dwell time for this stop is 30 minutes and the vehicle arrived 45 minutes ago, zero minutes of estimated dwell time remain, and the ETA for the next stop is incremented up by the system as time passes until the vehicle starts moving again and time remaining until arrival is counted down again by the system.

If a stop has been arrived at early (e.g., before the start of the delivery window) and the stop type is one of a fuel stop, a rest stop (short), a rest stop (long), or a rest stop (cycle reset), then dwell time is decremented immediately by the system. While the driver arrived earlier than expected, there is nothing preventing them from immediately starting to fuel or take their rest break. ETAs for later stops follow the above behavior. If a stop has been arrived at early (before the start of the delivery window) and the stop type is a work stop, then the system does not start decrementing the estimated dwell time until the start time passes. The driver in most cases is not allowed to start their work (which defines the dwell time) before the start of the delivery window as the location is either actually or effectively closed to that driver until the delivery window opens. As a first example of this concept, if the estimated dwell time for this stop is 30 minutes with a delivery window of 0700 to 0900 and if the driver arrives at 0715, they are on time and dwell time starts decrementing immediately within the operating system. As of the 0715 arrival time, those 30 minutes of estimated dwell time are all that affects later ETAs (assumed departure time is 0745). As a second example, if the estimated dwell time for this stop is 30 minutes with a delivery window of 0700 to 0900 and if the drivers arrives at 0645, they are early, and the system does not start decrementing the dwell time until 0700 (start time for the delivery window). As of the 0645 arrival time, the 15 minutes of "early" time until the delivery window opens are added by the system to the 30 minutes of estimated dwell time, which affects the ETAs of later stops by a total of 45 minutes (assumed departure time is no earlier than 0730 no matter how early the driver arrives at the location of this stop).

"Origin" and "Destination" stop types are used by the operating system to represent the actual starting and ending locations of the vehicle and are not actually stops where work or rest is expected to be done. As such, these stops will not have dwell times associated with them by the system that can affect ETAs of later stops. A "Waypoint" stop type is used by the system to modify the route path between actual stops and, therefore, will also not have a dwell time assigned by the system that can affect the ETAs of later stops. Regardless of the value of the estimated dwell time, once the vehicle departs a location, all remaining estimated dwell time is removed by the system from remaining stops' ETA calculations. For example, if the estimated dwell time for this stop is 30 minutes and the vehicle arrived 22 minutes ago, the system determines that 8 minutes of dwell time remain. Until the depart event occurs, those 8 minutes affect ETAs of later stops, e.g., a next stop may have an ETA of 15:38. If, however, the vehicle departs that location or stop at the 22-minute mark, the system removes the estimated 8 minutes of remaining dwell time, which results in an update ETA for the next stop of 15:30 (rather than 15:38).

Figure 4:
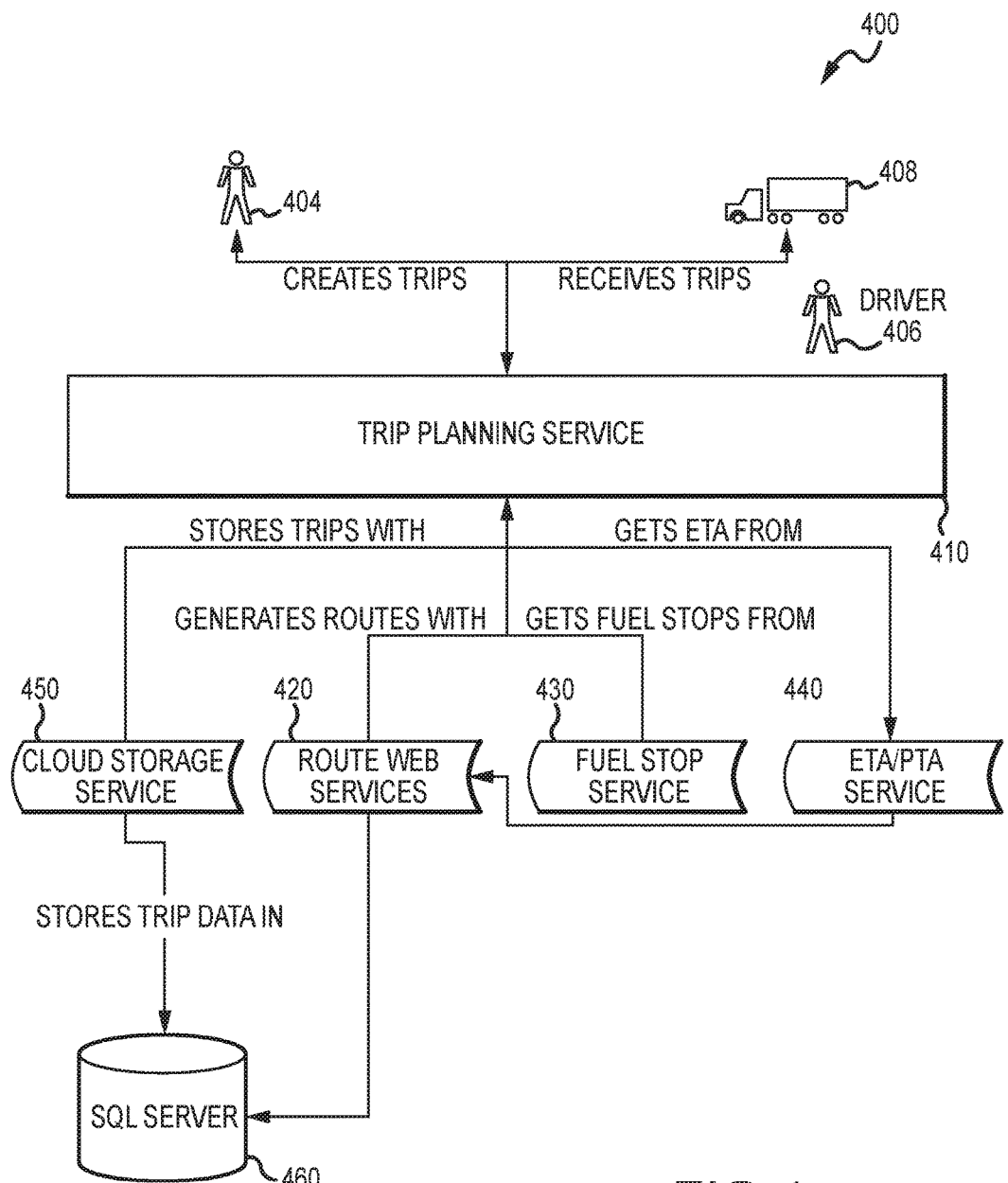
FIG. 4 is a functional block diagram of another transportation management system of the present description (e.g., a system for performing the methods of FIGS. 2 and 3)

FIG. 4 illustrates another useful embodiment of a transportation management system 400 of the present description such as may be used to perform the methods 200 and 300 of FIGS. 2 and 3 or to perform the functions described above in the use/working examples of the new trip optimization concepts of the present description. As shown, a trip planning service 410 is run or provided within the system 400 such as a cloud or web-based service or by running software (at least partially) on a dispatcher/back office computer system/network. As shown, a dispatcher/operator 404 interacts with the trip planning service to create the trip such as by inputting a set of work stops, a driver 406, and a truck(s) 408 for completing the trip, product/load to be picked up and delivered, and other parameters affecting the trip plan generation. The driver 406 receives (e.g., in a wireless manner on their portable device or truck-based device/system) the trip plan from the trip planning service 410 such as during an initial stage(s) that allows them to select alternative non-work stops (e.g., alternative fuel or rest stops) and as a "final" trip plan (which may later be modified during execution and then reoptimized as discussed above after the insertion of the newly selected stops).

Further, as shown, the trip planning service 410 calls or uses a route generation/planning (or optimization) service 420 to generate the base route line and routes with work stops and non-work stops. The fuel stops are inserted into this route, and these stops are obtained from a fuel stop service 430. Again, the originally optimized fuel stops from service 430 may be modified to include one or more alternative fuel stops identified by the trip planning service after they are selected by the driver 406 (after they receive the trip plan), and the modified set of fuel stops are inserted and the route reoptimized by the route web services 420. The trip planning service 410 further identifies non-work stops such as rest stops, and the driver may choose to replace "optimal" stops with preferred rest stops. These rest stops are inserted into the trip plan, and the route web services 420 are used to provide an optimized route that includes the rest stops or other non-work stops to be used in the trip plan dispatched to the driver 406 (and accessible by other users of the system 400 such as dispatcher 404 using a back office system or their own portable device).

Prior to final dispatch, though, the trip planning service 410 also calls or uses an ETA/PTA service 440 to obtain both an ETA and a PTA for each stop included in the trip plan, and these values are updated each time the trip plan is modified such as to include a new rest or fuel stop or to reflect a modified dwell time at a work stop or longer/shorter drive time between stops (e.g., during planning stages and also during execution of the trip plan by the driver 406 using the truck 408). The trip planning service 410 then functions to store the trip plan with a cloud storage service 450, which may store the trip plan and associated date in a database server 460.

As can be seen in FIG. 4, the trip planning service 410 creates the comprehensive trip plan by communicating with multiple services 420, 430, and 440 and compiling all the information it receives (along with the data it separately generates) into a single trip plan. The cloud service 450 is used for storage and retrieval of saved compliant trips. The route-generating web services 420 are used for generating optimized routes between the stops input by the user (dispatcher 404 and/or driver 406). The fuel stop service 430 provides fuel stops along the generated route. The ETA/PTA service 440 calculates the driver's hours of service (HOS) and can be used (or this may be performed by the trip planning service 410) to insert rest stops at appropriate intervals. This service 440 also may communicate with the route-generating web service 420 to cause the trip plan to be reoptimized after rest stops are inserted into the trip plan.

Figure 5:
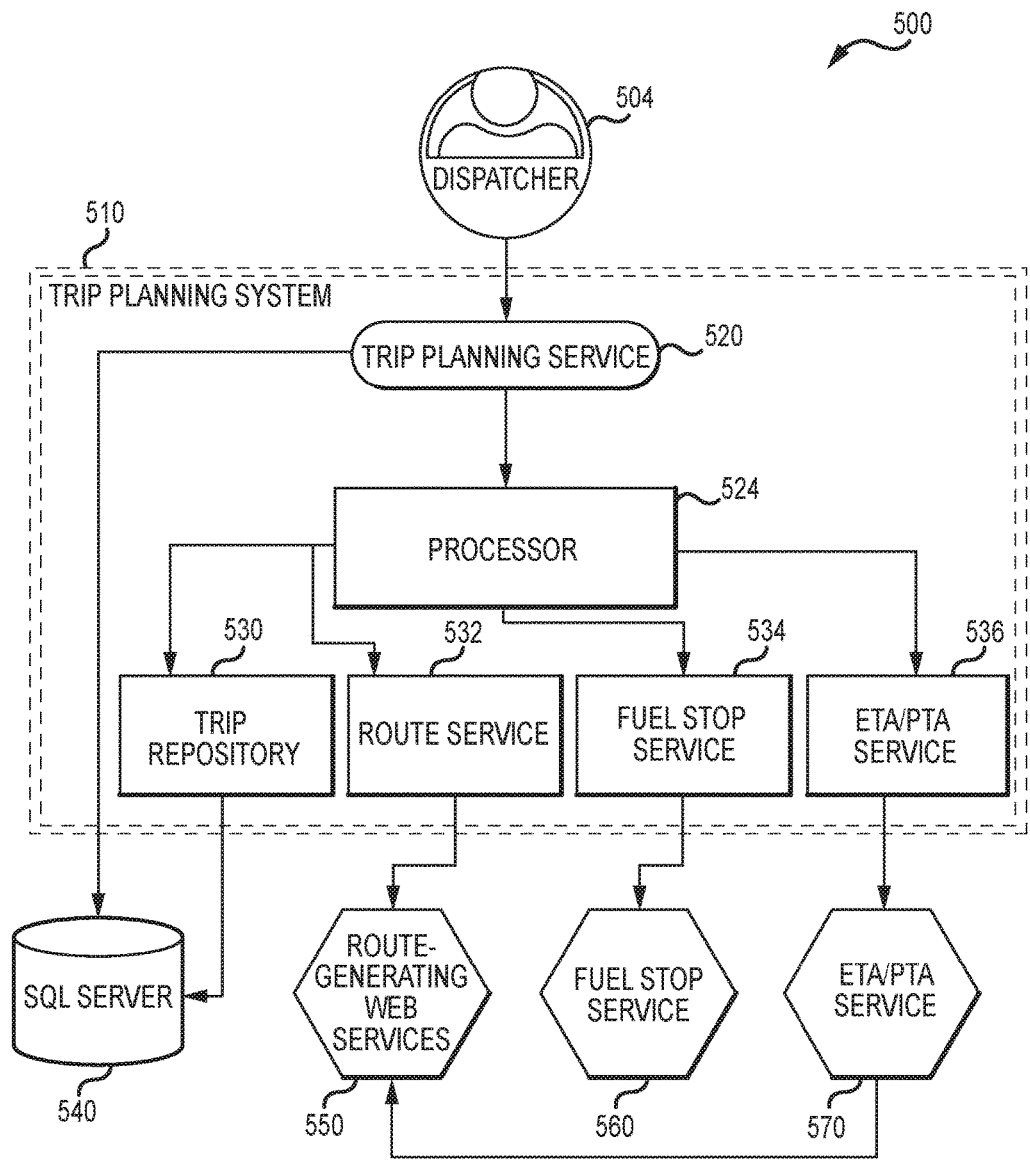
FIG. 5 is a functional block diagram of an additional transportation management system of the present description similar to that shown in FIG. 4.

FIG. 5 illustrates another example of a transportation management system 500 similar to that shown in FIG. 4. In FIG. 5, a user/dispatcher 504 interacts (such as with their computing device) with or operates a trip planning system 510 to generate an optimized trip plan. The trip planning service (or trip optimization tool) 520 is run on the system 510 with a processor 524 (e.g., is software run or code in computer readable media executed by the processor 524 to perform the trip planning functions described herein). The trip planning service 520 is responsible for validating requests, logging, and exception handling and for taking each trip through the steps required to generate an HOS-compliant trip plan. To this end, the trip planning service 520 may generate the trip plan by calling a route service 532, a fuel stop service 534, and an ETA/PTA service 536 also provided in the system 510 (e.g., software tools or applications called by or run by the processor 524). These services 532, 534, 536 may perform the needed trip planning functions by themselves or call web-based or external services 550, 560, and 570 to provide all or some of the trip generation steps (as shown in FIG. 5), e.g., the services 532, 534, 536 may be responsible for communications between the trip planning service 520 and the external services 550, 560, and 570.

Figure 6B:
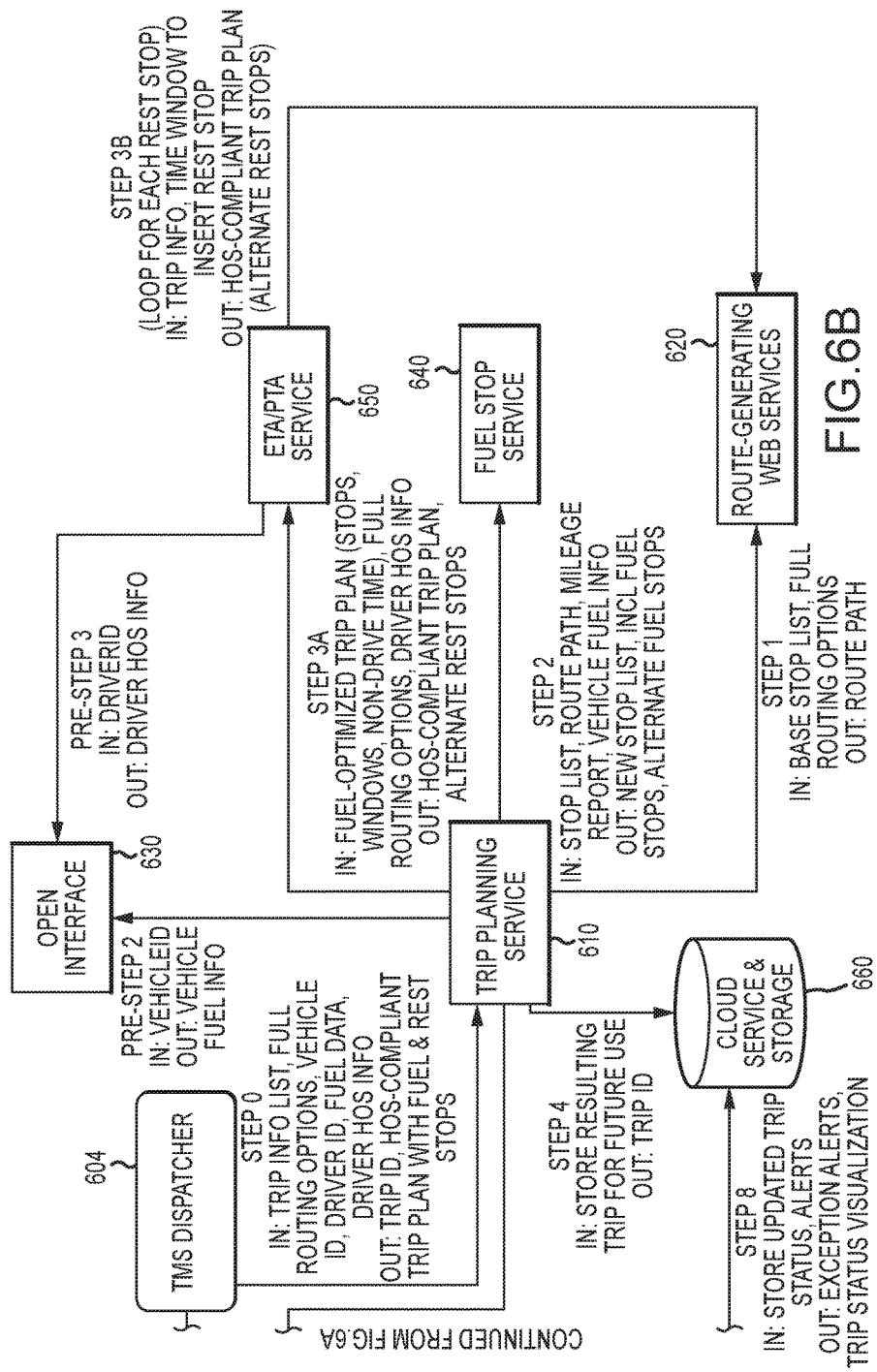

FIGS. 6A and 6B illustrate a transportation management system 600 (which is divided into its client-side architecture and service side architecture) while the system 600 is operating to provide trip planning services as described herein. The system 600 includes a trip planning service (e.g., a software application or suite run by computer system such as on a dispatcher or back office system or accessible by the dispatcher as a hosted application or the like) 610 and a travel management system or dispatcher computing device 604 operated by a dispatcher. Pre-configuration or prior to starting the steps shown in FIGS. 6A and 6B the driver-side application and/or trip planning in-cab software/applications have been completed as well as other initial steps such as defining the fuel network to be used in execution of the trip. In Step 0, the TMS/dispatcher 604 sends the trip (or trip request) to the trip planning service, which may include a trip information list (such as work stops and load(s)), full routing options, vehicle and driver IDs, fuel data, driver HOS, and other information to the trip planning service 610. As shown, the trip ID is returned as well as a trip plan that is HOS-compliant with fuel and rest stops (non-work stops) upon completion by the trip planning service 610.

To this end, the system 600 also includes a route-generating service (e.g., a web service) 620 that is used by the trip planning to obtain a route path for the trip, and initially the service 610 communicates the work stop list to the route-generating service 620 along with full routing options (route modifiers and the like) as part of Step 1. In Step 2, the trip planning service 610 communicates with a fuel stop service 640, which is configured for generating an optimized list of fuel stops, and, as part of Step 2, the trip planning service 620 provides the stop list (work stops) along with the route path from the route-generating service 620, a mileage report, and vehicle fuel information to the fuel stop service 640. The fuel stop service 640 responds by providing a new stop list that includes the fuel stops (which may be chosen based on the vehicle fuel tank size, cost of fuel per state, and so on) with the work stops, and, in some cases, the list will include a set of alternate fuel stops for the driver to select from and these may be filtered by the service 640 based on driver preferences (or this may be done by the trip planning service 610) or be unfiltered (all viable fuel stops as alternatives). Prior to Step 2, a Pre-Step 2 may be performed with the trip planning service 610 communicating the vehicle ID to an open interface/module 630 to obtain the vehicle fuel information from data storage.

As shown in FIG. 6B, a Step 3A may then be performed that includes the trip planning service 610 using an ETA/PTA service 650 to obtain an HOS-compliant trip plan with alternate rest stops. The trip planning service 610 provides input in the form of the fuel-optimized trip plan (with fuel and work stops, windows, and non-drive or dwell time) as well as driver HOS information. To this end, the ETA/PTA service 650 may perform Pre-Step 3 by obtaining the driver HOS information by providing the driver ID to the open interface module 630. Further, Step 3B is performed, as a loop for each rest stop, at this point that involve the ETA/PTA service 650 providing the route-generating service 620 the current trip information and time windows to insert the next rest stop, and the route-generating service 620 returns an HOS-compliant trip plan (with alternate rest stops) that has a new route optimized to suit the inserted rest stops. ETAs and PTAs are determined for each stop in the trip plan (work stops, fuel stops, and rest stops).

Step 4 is then performed by the trip planning service 610 to cause the trip plan to be stored, e.g., in cloud service and storage 660, for later use, and a trip ID is assigned to the stored trip plan. In Steps 5A and 5B, the TMS/dispatcher 604 dispatches the trip plan via an open interface module 666 to the driver's device 670, with the trip planning service 610 providing the vehicle ID, the driver ID, and other useful data. Step 5C is shown to include the driver-side application or plugin 674 running on the driver's device 670 acting to provide the trip plan along with GUI generation/display information to the input/output devices of the driver's device 670. At Step 6 (shown at 675), this causes the driver's device to display the trip plan along with navigational/route information, which may include a display of alternate stops that they may select to modify the trip plan.

In Step 7A, the driver's side app 674 (or telematics applications/equipment in the truck) may cause alerts to be transmitted and/or the trip plan to be updated as driving or trip execution occurs. These alerts and updates are transmitted to an Internet gateway 680 and to a fleet service module 690 in a Step 7B, and in Step 8, the updated trip plan and alerts are stored in storage 660. Further, Step 8 may include exception alerts to be transmitted through the system 600 and the status visualization on the driver's device 670 to be updated.

Figure 7:
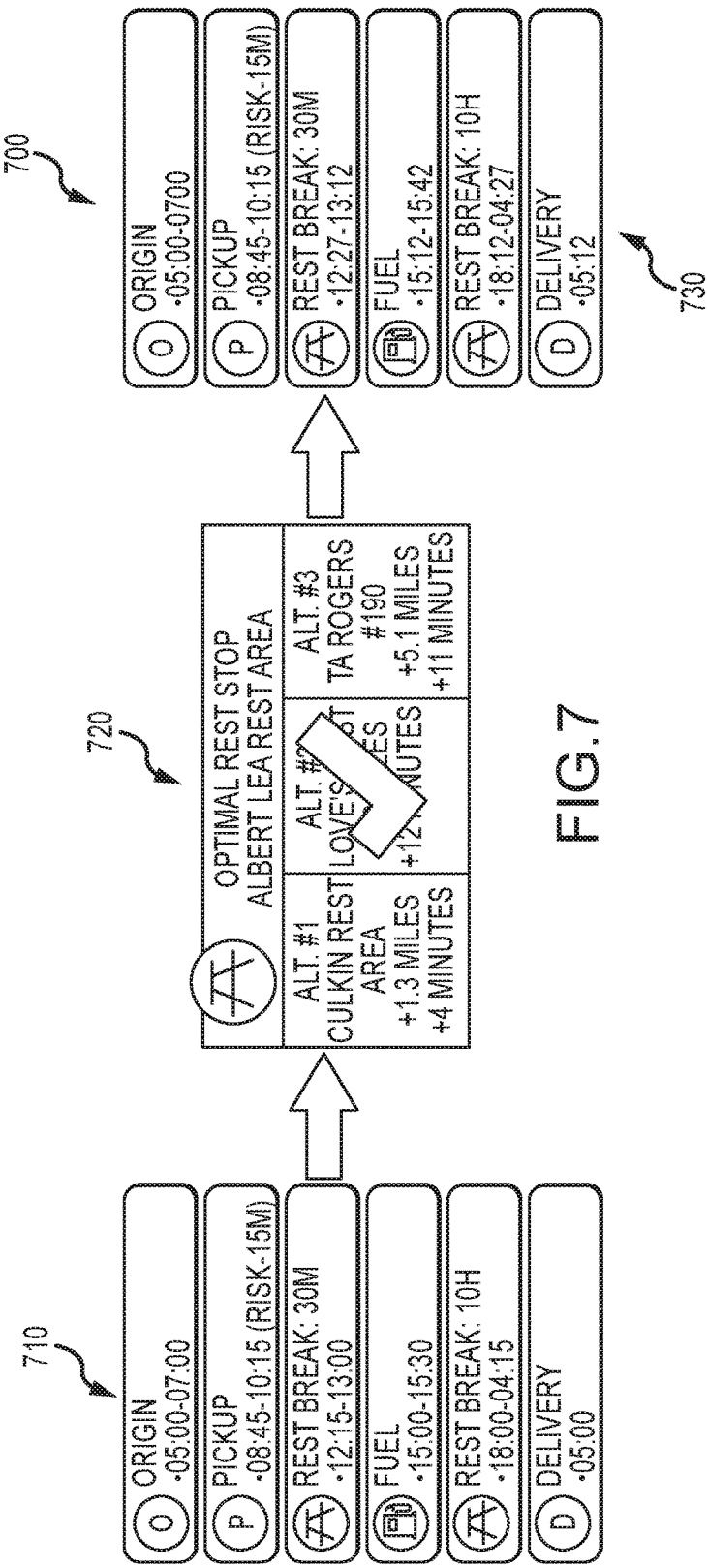
FIG. 7 is a screen shot(s) of a GUI that may be provided to a driver for selection of an alternate rest stop to modify a dispatched trip plan.

FIG. 7 illustrates a series 700 of screen shots 710, 720, 730 that may be provided to a driver during planning or execution stages of a trip plan by a transportation management system of the present description. For example, a trip planning GUI may be generated by the transportation manager that may be served to the driver's device for display on its monitor or display screen (e.g., a touchscreen of a cellphone, tablet, pad, or the like). In screen shot 710, an optimized or initial trip plan may be displayed to a driver, and this trip plan includes three work stops (e.g., origin/starting location, a pickup, and a delivery) along with three non-work stops (e.g., a short rest stop (30-minute break), a fuel stop, and a long rest stop (10-hour break)).

As discussed above, the transportation system (and associated methods) may allow the driver to modify the trip plan shown in screen shot 710 to include preferred or driver-selected stops. To this end, the driver may select one of the non-work stops to determine whether there are alternate stops available as part of the trip plan for their selection. In this example, the driver has selected (e.g., by selecting a button or pressing a touch screen near a displayed icon/symbol or the like) with user input the short (or first) rest stop of the trip plan. In response, the driver's-side app may respond by updating the GUI as shown with screen shot 720 to show details of the optimized or system-selected rest stop along with a set of alternate but still viable rest stops/locations that may be chosen by the driver to modify the trip plan shown in screen shot 710. In this example, the driver selects one of the alternate stops, and screen shot 730 shows a modified trip plan that includes the driver-selected alternate rest stop (e.g., replaces the original rest stop with the new rest stop). It can be seen that the trip plan is updated to reflect that the short rest break starts at a later time and also to show how the change in the rest stop affects later stops (in this case, each later stop is delayed 12 minutes when compared with the original and more optimal (for trip efficiency) rest stop provided in the trip plan shown in screen shot 710).

In an alternate embodiment of the transportation management system 100, the system 100 may be configured to provide comprehensive trip optimization without driver input, such as in the case of a driverless vehicle that may be remotely operated or self-operating. In this case, the system still includes one or more vehicles 110, and a vehicle device instead of a driver's device 120 that provides navigation, mapping, and/or routing for the vehicle, a back office or dispatcher system 140 (e.g., any computer or computing device such as a router/server combined with one or more workstations that provide the functionality described herein), and communications network 104 (such as wired or wireless digital communications network) communicatively linking the system components together. This alternate embodiment for system 100 may be further modified for use without a driver such as when the vehicle 110 is configured for remote operation or as a driverless vehicle.

In one possible embodiment, the trip plan provided by the transportation manager (or transportation management system) and served to the operator/driver is also provided to the navigation system for the vehicle. In this way, the system provides a real-time navigation solution for the trip plan including routing/mapping as needed for the operator/driver to execute the trip plan. This navigation system is provided to the operator/driver of the vehicle through the vehicle's device GUI (or a client device used by the driver/operator). The navigation system updates the routing/mapping when the trip plan is updated, accounting for any changes in work stop and non-work stop definitions. ETA and PTA calculations for all stops update accordingly, based off the impacts of changes to routing/mapping that flow from the changes in work stop and non-work stop definitions. Any variation in actual execution of the trip plan from the planned routing/mapping is accounted for through updates to routing/mapping in the navigation system for the vehicle and resultant updates to ETA and PTA calculations. The navigation system also updates routing/mapping according to changes in vehicle status or road condition status.

In one possible embodiment, the trip plan provided by the transportation manager is served to the operator/driver through the navigation system running on the driver's device in the device GUI. The navigation system provides a real-time navigation solution for the trip plan including routing/mapping as needed for the operator/driver to execute the trip plan. The navigation system updates the routing/mapping when the trip plan is updated, accounting for any changes in work stop and non-work stop definitions. Driver input to select one or more of the alternate stops is made available through the navigation system in the device GUI. ETA and PTA calculations for all stops update accordingly, based off the impacts of changes to routing/mapping that flow from the changes in work stop and non-work stop definitions. Any variation in actual execution of the trip plan from the planned routing/mapping is accounted for through updates to routing/mapping in the navigation system for the vehicle, and resultant updates to ETA and PTA calculations. The navigation system also updates routing/mapping according to changes in vehicle status or road condition status.

In one possible embodiment, the trip plan provided by the transportation manager is served to the navigation system for the vehicle running on the vehicle's device, providing a real-time navigation solution for the trip plan including routing/mapping as needed for the vehicle to complete the trip plan. The navigation system updates the routing/mapping when the trip plan is updated, accounting for any changes in work stop and non-work stop definitions. ETA calculations for all stops update accordingly, based off the impacts of changes to routing/mapping that flow from the changes in work stop and non-work stop definitions. Any variation in actual execution of the trip plan from the planned routing/mapping is accounted for through updates to routing/mapping in the navigation system for the vehicle, and resultant updates to ETA calculations. The navigation system also updates routing/mapping according to changes in vehicle status or road condition status.

As an alternate embodiment of method 200 of FIG. 2, the presentation of alternate fuel stops to the driver at step 246 may be delayed until after all sets of alternate non-work stops have been created (e.g. step 270 for rest stops). In this case, once the alternate fuel stops have been generated at step 246, the trip plan generation continues directly with determining the set of optimized rest stops at step 260, updating the trip to include those rest stops at step 264, and creating alternate rest stops for the trip plan at step 270. Once all sets of non-work stops have been generated, all sets of non-work stops are made available to be provided to the driver. At this point, the driver may select alternate fuel stop(s) at step 248 resulting in the method continuing with a modification of the trip plan to include the new fuel stop(s) at step 250. In addition or alternately, the driver may select alternate rest stop(s) at step 276 resulting in the method continuing with a modification of the trip plan to include the new rest stop(s) at step 280. This includes optimizing the routes with all defined stops, and it also includes calculating new ETAs and PTAs for each of the stops in the trip plan. Then, the method 200 ends at 290 (e.g., with delivery/dispatching of the final trip plan to the driver and/or driver's vehicle). Note, as discussed further herein, additional non-work stops such as maintenance stops may also be included in the trip plan, and steps may be included in the method 200 to insert these additional stops (along with ETA and PTA calculations).

In one embodiment as described above, a transportation management system is provided for generating or managing trip plans for one or more vehicles. The system includes: (a) a trip planning tool, running on one or more computing devices, defining a set of work stops for a vehicle; (b) one or more devices associated with the vehicle that is operable by a driver or a remote operator or that is self-driving; (c) a service generating a set of non-work stops for inclusion in the trip plan based on at least one of operating data for the vehicle, hours of service for the driver or the remote operator, and needs or preferences of a user of the transportation management system; and (d) a service generating a trip plan wherein the defined work stops and the generated non-work stops are included in the trip plan. Each of these services may be provided via a combination of software and hardware on one computing device or system and/or on a network of such devices.

In practice, the service generating the set of non-work stops may include a set of rest stops selected for inclusion in the trip plan based on at least one of current, historical, and estimated future hours of service (HOS) status for the remote operator or the vehicle driver, and the trip planning tool may generate a trip plan which includes the work stops and the set of rest stops and any other stops in the set of non-work stops generated by the trip planning tool or added by the user of the transportation management system. In such cases, the set of rest stops may be generated such that the set of rest stops is the most efficient possible for the trip plan based on the needs or preferences of the user of the system. Further, the service generating the set of non-work stops may further generate a set of alternate rest stops for the trip plan based on at least one of the current, historical, and estimated future hours of service (HOS) status for the remote operator or the vehicle driver, and the set of alternate rest stops can be provided with the trip plan to the one or more devices operable by the remote operator or the vehicle driver for display in a graphical user interface (GUI). Also, the trip planning tool can modify the trip plan to replace one of the rest stops with one of the alternate rest stops selected by the vehicle operator. Additionally, the set of alternate rest stops can be selected to match a set of preferences for rest stops associated with the user of the transportation management system, and the set of alternate rest stops can be selected to match a set of preferences for rest stops associated with the remote operator or the vehicle driver.

In the same or other implementations, the set of non-work stops can include a set of fuel stops for inclusion in the trip plan generated based on at least one of current, historical, and estimated operating information for the vehicle, and the trip planning tool may be configured to generate a trip plan which includes the work stops and the set of fuel stops and any other stops in the set of non-work stops generated by the trip planning tool or added by the user of the transportation management system. In such implementations, the set of fuel stops may be generated such that the set of fuel stops generated is the most efficient possible for the trip plan based on the needs or preferences of the user of the transportation management system. Further, the service generating the set of non-work stops may be configured to further generate a set of alternate fuel stops for the trip plan based on at least one of the current, historical, and estimated operating information for the vehicle, and the set of alternate stops can be provided with the trip plan to the device operable by the remote operator or the vehicle driver for display in a GUI. Also, the trip planning tool can be adapted to modify the trip plan to replace one of the fuel stops with one of the alternate fuel stops selected by the remote operator or the vehicle driver. Additionally, the set of alternate fuel stops can be selected to match a set of preferences for fuel stops associated with the user of the transportation management system, and the set of alternate fuel stops can be selected to match a set of preferences for fuel stops associated with the remote operator or the vehicle driver.

In some implementations of the system, the set of non-work stops includes a set of maintenance stops for inclusion in the trip plan selected based on at least one of current, historical, and estimated vehicle operating information and vehicle maintenance data, and the trip planning tool generates a trip plan which includes the work stops and the set of maintenance stops and any other stops in the set of non-work stops generated by the trip planning tool or added by the user of the transportation management system. In such implementations, the set of maintenance stops can be generated such that the set of maintenance stops generated is the most efficient possible for the trip plan based on the needs or preferences of the user of the transportation management system. Also, the service generating the set of maintenance stops can be configured to further generate a set of alternate maintenance stops for the trip plan based on at least one of current, historical, and estimated vehicle operating information and vehicle maintenance data, and the set of alternate stops is provided with the trip plan to the device operable by the remote operator or the vehicle driver for display in a GUI. Further, the trip planning tool modifies the trip plan to replace one of the maintenance stops with one of the alternate maintenance stops selected by the remote operator or the vehicle driver. Still further, the set of alternate maintenance stops may be selected to match a set of preferences for maintenance stops associated with the user of the transportation management system, and the set of alternate maintenance stops may be selected to match a set of preferences for maintenance stops associated with the remote operator or the vehicle driver.

In the same or other implementations, the set of non-work stops includes a set of border crossing stops selected for inclusion in the trip plan based on planned or alternate route paths, and the trip planning tool generates a trip plan which includes the work stops and the set of border crossing stops and any other stops in the set of non-work stops generated by the trip planning tool. In such cases, the set of border crossing stops may be generated to be the most efficient possible for the trip plan based on the needs or preferences of the user of the transportation management system. Further, the service generating the set of border crossing stops may be configured to further generate a set of alternate border crossing stops for the trip plan based on planned or alternate route paths, and the set of alternate stops can be provided with the trip plan to the device operable by the remote operator or the vehicle driver for display in a GUI. Also, the trip planning tool modifies the trip plan to replace one of the border crossing stops with one of the alternate border crossing stops selected by the remote operator or the vehicle driver. Further, the set of alternate border crossing stops may be selected to match a set of preferences for border crossing stops associated with the user of the transportation management system, and the set of alternate border crossing stops may be selected to match a set of preferences for border crossing stops associated with the remote operator or the vehicle driver.

In some embodiments, the system includes a service calculating an estimated time of arrival (ETA) for the vehicle to each of the work stops and the non-work stops in the trip plan. In such embodiments, the ETAs are calculated based on a dwell time for the vehicle estimated for each of the work stops and the non-work stops in the trip plan, and the ETAs may be calculated based on a combination of predicted travel time between each sequential one of the work stops or the non-work stops in the trip plan and the estimated dwell time for the vehicle at each of the work stops and the non-work stops in the trip plan. Further, the estimated dwell time of each of the work stops and non-work stops in the trip plan accounts for an appointment window for that stop such that the end of the estimated dwell time for that stop is a time later than the start of the appointment window plus the estimated dwell time. Additionally, the service generating the ETAs may be configured to calculate the ETAs based on updating vehicle location and time during execution of the trip plan. In such cases, in response to changes to the ETAs calculated for each of the work stops and the non-work stops in the trip plan, notifications are provided to the user of transportation management system or are provided to the device operable by the remote operator or the vehicle driver for display in a GUI.

In some embodiments, the system includes a service calculating a projected time of availability (PTA) for the remote operator or the vehicle driver for each of the work stops and the non-work stops in the trip plan. In such embodiments, the PTAs are calculated based on a dwell time for the vehicle estimated for each of the work stops and the non-work stops in the trip plan. Further, the estimated dwell time for each of the work stops or the non-work stops in the trip plan accounts for an appointment window for that stop such that the end of the estimated dwell time for that stop is a time later than the start of the appointment window plus the estimated dwell time. Additionally, the PTAs may be calculated based on a dwell time for the vehicle estimated for each of the work stops and the non-work stops in the trip plan and the expected impact to the estimated HOS based on the type of stop. In some cases, the PTAs are calculated based on a combination of predicted travel time between each sequential one of the work stops or the non-work stops in the trip plan and the estimated dwell time for the vehicle at each of the work stops and the non-work stops in the trip plan. Additionally, the service generating the PTAs may be configured to calculate the PTAs based on updating vehicle location and time and the HOS status for the remote operator or the vehicle driver during execution of the trip plan. Additionally, in response to changes to the PTAs calculated for each of the work stops and the non-work stops in the trip plan, the system may be configured such that a notification is provided to the user of the transportation management system or is provided to the device operable by the remote operator or the vehicle driver(s) for display in a GUI.

In some embodiments of the travel management system, the trip plan with the work stops and the non-work stops is implemented in a navigation system for the vehicle. In such embodiments, the trip plan with the work stops and the non-work stops is implemented in the navigation system for the vehicle and provided to the device operable by the remote operator or the vehicle driver for display in a GUI.

In another exemplary embodiment of the above description, a system is provided for generating a trip plan for a vehicle. The system includes: (a) a trip planning service generating a first trip plan that defines a first route for the vehicle based on one or more work stops; (b) a service generating a set of non-work stops for the first trip plan based on at least one of operating data for the vehicle, hours of service for an operator or driver of the vehicle, and needs or preferences of a user of the system; (c) a service generating a second trip plan with a second route for the vehicle that includes the work stops and the non-work stops; (d) a service generating ETAs for each of the work stops and the non-work stops, wherein the ETAs are included in the second trip plan; and (e) a service generating PTAs for the operator or the driver of the vehicle for each of the work stops and the non-work stops, where the PTAs are included in the second trip plan.

In some embodiments of this exemplary system, the non-work stops include one or more rest stops for the vehicle operator or vehicle driver based on HOS status, and the trip planning service is configured to generate a third trip plan with a third route for the vehicle that includes the work stops, the one or more rest stops, and any other stops in the non-work stops generated by the service generating the set of non-work stops or added by the user of the system. In such an embodiment, the non-work stops may include one or more fuel stops for the vehicle based on the operating data for the vehicle, and the trip planning service may be configured to generate a third trip plan with a third route for the vehicle that includes the work stops, the one or more fuel stops, and any other stops in the non-work stops generated by the service generating the set of non-work stops or added by a user of the system. In these embodiments, the system may also include a device operable by the operator or the driver of the vehicle for receiving the second trip plan and displaying a set of information associated with the second trip plan including a set of alternate rest stops, and the trip planning service may be adapted to respond to a selection by the operator or the driver of the vehicle of one of the alternate rest stops by generating a third trip plan including a third route with the work stops, the selected one of the alternate rest stops, and any other stops in the non-work stops generated by the service generating the non-work stops or added by the user of the system.

In these or other embodiments, the system can include a device operable by the operator or the driver of the vehicle for receiving the second trip plan and displaying a set of information associated with the second trip plan including a set of alternate fuel stops, and the trip planning service may be configured to respond to a selection by the operator or the driver of the vehicle of one of the alternate fuel stops by generating a third trip plan including a third route with the work stops, the selected one of the alternate fuel stops, and any other stops in the set of non-work stops generated by the service generating the non-work stops or added by the user of the system. In these or other embodiments, the system may further include a device operable by the operator or the driver of the vehicle for receiving the second trip plan and displaying a set of information associated with the second trip plan, and the trip planning service may be adapted to respond to user input from the operator or the driver of the vehicle by replacing one of the rest stops with a new rest stop or inserting a rest stop into the second route and by generating a third trip plan including a third route with the work stops, the new rest stop, and any other stops in the set of non-work stops generated by the service generating the non-work stops or added by the user of the system.

In this or other embodiments, the system may include a device operable by the operator or the driver of the vehicle for receiving the second trip plan and displaying a set of information associated with the second trip plan, and the trip planning service may be adapted to respond to user input from the operator or the driver of the vehicle by replacing one of the fuel stops with a new fuel stop or by inserting a fuel stop into the second route and by generating a third trip plan including a third route with the work stops, the new fuel stop, and any other stops in the set of non-work stops generated by the service generating the non-work stops or added by the user of the system. In the same or other embodiments, the system may further include a device operable by the operator or the driver of the vehicle for receiving the second trip plan and displaying a set of information associated with the second trip plan, and the trip planning service may be adapted to respond to user input from the operator or the driver of the vehicle modifying at least one of drive time, dwell time at a stop, and the second route by generating a third trip plan including a third route with the work stops, any modified stop, and the non-work stops the service generating the set of non-work stops or added by a user of the system.

In some embodiments of the system, the service generating ETAs generates ETAs based on a subsequent change to the trip plan including generation of a third trip plan including a third route. In the same or other embodiments, the service generating PTAs generates PTAs based on a subsequent change to the trip plan including generation of a third trip plan including a third route.

In some embodiments of the above description, a method is taught for planning and implementing a trip for a vehicle. The method includes: (a) generating a first trip plan including a route, a set of work stops, and a set of non-work stops; (b) calculating ETAs for a vehicle at each of the work and non-work stops based on dwell times associated with each of the work and non-work stops; and (c) displaying a set of information associated with the first trip plan including the ETAs. In implementing the method, the method may further include, during execution of the first trip plan with the vehicle, generating a second trip plan with one or more updated ETAs based on a change in planned stops or in driving or non-driving time, and displaying a set of information associated with the second trip plan including the one or more updated ETAs.

In some implementations of the method, the non-work tops include rest stops. In such cases, the method includes calculating PTAs for each of the work stops based on HOS for an operator or driver of the vehicle and the rest stops. Also, in these cases, the method may include determining a set of alternate rest stops, displaying the set of alternate rest stops with the set of information, receiving user selection of one of the alternate rest stops, and generating a second trip plan including a second route with the user-selected one of the alternative rest stops. Then, the method may be provided with the set of alternate rest stops being selected based on preferences of the operator or the driver of the vehicle. To implement the method, the rest stops may be selected based on an HOS status for the operator or the driver of the vehicle. Alternatively or additionally, the rest stops may be selected based on optimization for the trip plan and system users.

In some implementations of the method, the non-work stops include fuel stops. In such cases, the method may further include determining a set of alternate fuel stops, displaying the set of alternate fuel stops with the set of information, receiving user selection of one of the alternate fuel stops, and generating a second trip plan including a second route with the user-selected one of the alternative fuel stops. In such cases, the set of alternate fuel stops can be selected based on the preferences of the operator or the driver of the vehicle. In some cases, the fuel stops are selected based on vehicle operating status. In other or the same cases, the fuel stops are selected based on optimization for the trip plan and system users. In some implementations of the method, the non-work stops include maintenance stops and/or border crossing stops.

In some embodiments of the description, a system or service is provided for dynamic integration of hours of service with a navigation system associated with a vehicle. The system includes: (a) a service receiving directly from a vehicle tachometer, a tachograph, an external module, or another service at least one of current, historical, and estimated future hours of service (HOS) status for an operator or driver of the vehicle defined by regulations under which the operator or the driver are operating or driving the vehicle; (b) a service generating an estimated time at which the operator or the driver of the vehicle will require each rest break period per the regulations under which the operator or the driver of the vehicle are operating or driving the vehicle; (c) a service determining whether the time at which each rest stop is planned in a trip plan exceeds the estimated time at which the associated rest break period is required; and (d) a service that updates the trip plan and a navigation route to include a replacement rest stop that is predicted to be reachable within remaining hours of service for the operator or the driver of the vehicle dictating when each of the rest break periods are taken, with the remaining hours of service being calculated based on the at least one of the current, historical, and estimated future HOS status.

In some implementations of such a service or system, updates to the trip plan and the navigation route to include the replacement rest stop are automatically generated based on the HOS status of the operator or the driver of the vehicle. In the same or other implementations, updates to the trip plan and the navigation route to include the replacement rest stop are provided as a set of alternative stops that are selectable by the operator or driver of the vehicle. Then, the system may include a service generating a set of alternative rest stops that are valid within the remaining HOS for the operator or the driver of the vehicle. The service or system may also include a service calculating ETA for each of the planned rest stops and/or a service calculating PTA for each of the planned rest stops.

In another embodiment of the present description, a system (or service) is provided for integration of current, historical, and estimated vehicle fuel levels, vehicle fuel capacity, and vehicle fuel consumption rate with a navigation system associated with a vehicle. The system includes: (a) a service receiving directly from the vehicle or through an external module vehicle data including current fuel levels and an average or expected fuel consumption rate; (b) a service generating an estimated time or distance remaining which the vehicle might travel prior to fuel levels falling below a refueling threshold; (c) a service determining whether a next planned fuel stop in a trip plan exceeds the estimate time or distance; and (d) a service updating the trip plan and a navigation route to include a replacement fuel stop that is predicted to be reachable within the average or expected fuel consumption rate and the refueling threshold.

In this system, updates to the trip plan and the navigation route to include a replacement fuel stop may be automatically generated based on an operational status of the vehicle. Further, updates to the trip plan and the navigation route to include a replacement fuel stop may be provided as a set of alternative stops that are selectable by the operator or the driver of the vehicle. The system may further include a service generating a set of alternative fuel stops that are valid within a current operational status of the vehicle. Additionally, the system may include a service calculating ETA for each of the planned fuel stops and/or a service calculating PTA for each of the planned fuel stops.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products. The above described embodiments including the preferred embodiment and the best mode of the invention known to the inventor at the time of filing are given by illustrative examples only.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the applications 124, 150, 154, and 160 and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term dispatcher system and driver's device encompasses all apparatus, devices, and machines for processing data, including by way of example a programmable processor, a computer, or multiple processors or computers. The system (such as system 100 or 140 in FIG. 1) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, code, generator, module, manager, tool, and calculator) used to provide the functionality described herein (such as to generate an optimized trip plan, to calculate ETA or PTA, and to select alternative stops) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system or network 100 configured to implement the methods described herein. In different embodiments, system 100 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 524 of system 520 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

We claim:

1. A transportation management system for generating or managing trip plans for one or more vehicles, comprising;
   a trip planning tool, running on one or more computing devices, defining a set of work stops for a vehicle;
   one or more devices associated with the vehicle that is operable by a driver or a remote operator or that is self-driving;
   a service generating a set of non-work stops for inclusion in a trip plan based on at least one of operating data for the vehicle, hours of service for the driver or the remote operator, and needs or preferences of a user of the transportation management system; and
   a service generating the trip plan wherein the defined work stops and the generated non-work stops are included in the trip plan,
   wherein the service generating the set of non-work stops includes a set of rest stops selected for inclusion in the trip plan based on at least one of current, historical, and estimated future hours of service (HOS) status for the remote operator or the vehicle driver,
   wherein the trip planning tool generates a trip plan which includes the work stops and the set of rest stops and any other stops in the set of non-work stops generated by the trip planning tool or added by the user of the transportation management system,
   wherein the service generating the set of non-work stops further generates a set of alternate rest stops for the trip plan based on at least one of the current, historical, and estimated future hours of service (HOS) status for the remote operator or the vehicle driver,
   wherein the set of alternate rest stops are provided with the trip plan to the one or more devices operable by the remote operator or the vehicle driver for display in a graphical user interface (GUI), and
   wherein the trip planning tool modifies the trip plan to replace one of the rest stops with one of the alternate rest stops selected by the vehicle operator.

2. The system of claim 1, wherein the set of rest stops are generated such that the set of rest stops is the most efficient possible for the trip plan based on the needs or preferences of the user of the system.

3. The system of claim 1, wherein the set of alternate rest stops is selected to match a set of preferences for rest stops associated with the user of the transportation management system.

4. The system of claim 3, wherein the set of alternate rest stops is selected to match a set of preferences for rest stops associated with the remote operator or the vehicle driver.

5. The system of claim 1, wherein the set of non-work stops includes a set of fuel stops for inclusion in the trip plan generated based on at least one of current, historical, and estimated operating information for the vehicle, wherein the trip planning tool generates a trip plan which includes the work stops and the set of fuel stops and any other stops in the set of non-work stops generated by the trip planning tool or added by the user of the transportation management system.

6. The system of claim 1, wherein the set of non-work stops includes a set of maintenance stops for inclusion in the trip plan selected based on at least one of current, historical, and estimated vehicle operating information and vehicle maintenance data, wherein the trip planning tool generates a trip plan which includes the work stops and the set of maintenance stops and any other stops in the set of non-work stops generated by the trip planning tool or added by the user of the transportation management system.

7. The system of claim 6, wherein the set of maintenance stops is generated such that the set of maintenance stops generated is the most efficient possible for the trip plan based on the needs or preferences of the user of the transportation management system.

8. The system of claim 1, wherein the set of non-work stops includes a set of border crossing stops selected for inclusion in the trip plan based on planned or alternate route paths, wherein the trip planning tool generates a trip plan which includes the work stops and the set of border crossing stops and any other stops in the set of non-work stops generated by the trip planning tool.

9. The system of claim 8, wherein the set of border crossing stops is generated to be the most efficient possible for the trip plan based on the needs or preferences of the user of the transportation management system.

10. The system of claim 1, further comprising a service calculating an estimated time of arrival (ETA) for the vehicle to each of the work stops and the non-work stops in the trip plan.

11. The system of claim 10, wherein the ETAs are calculated based on a dwell time for the vehicle estimated for each of the work stops and the non-work stops in the trip plan.

12. The system of claim 11, wherein the estimated dwell time of each of the work stops and non-work stops in the trip plan accounts for an appointment window for that stop such that the end of the estimated dwell time for that stop is a time later than the start of the appointment window plus the estimated dwell time.

13. The system of claim 10, wherein the ETAs are calculated based on a combination of predicted travel time between each sequential one of the work stops or the non-work stops in the trip plan and the estimated dwell time for the vehicle at each of the work stops and the non-work stops in the trip plan.

14. The system of claim 10, wherein the service generating the ETAs calculates the ETAs based on updating vehicle location and time during execution of the trip plan.

15. The system of claim 1, further comprising a service calculating a projected time of availability (PTA) for the remote operator or the vehicle driver for each of the work stops and the non-work stops in the trip plan.

16. The system of claim 15, wherein the PTAs are calculated based on a dwell time for the vehicle estimated for each of the work stops and the non-work stops in the trip plan.

17. The system of claim 16, wherein the estimated dwell time for each of the work stops or the non-work stops in the trip plan accounts for an appointment window for that stop such that the end of the estimated dwell time for that stop is a time later than the start of the appointment window plus the estimated dwell time.

18. The system of claim 16, wherein the PTAs are calculated based on a dwell time for the vehicle estimated for each of the work stops and the non-work stops in the trip plan and the expected impact to the estimated HOS based on the type of stop.

19. The system of claim 16, wherein the PTAs are calculated based on a combination of predicted travel time between each sequential one of the work stops or the non-work stops in the trip plan and the estimated dwell time for the vehicle at each of the work stops and the non-work stops in the trip plan.

20. The system of claim 15, wherein the service generating the PTAs calculates the PTAs based on updating vehicle location and time and the HOS status for the remote operator or the vehicle driver during execution of the trip plan.

21. The system of claim 15, wherein, in response to changes to the PTAs calculated for each of the work stops and the non-work stops in the trip plan, a notification is provided to the user of the transportation management system or is provided to the device operable by the remote operator or the vehicle driver(s) for display in a GUI.

22. A transportation management system for generating or managing trip plans for one or more vehicles, comprising;
a trip planning tool, running on one or more computing devices, defining a set of work stops for a vehicle;
one or more devices associated with the vehicle that is operable by a driver or a remote operator or that is self-driving;
a service generating a set of non-work stops for inclusion in the trip plan based on at least one of operating data for the vehicle, hours of service for the driver or the remote operator, and needs or preferences of a user of the transportation management system; and
a service generating a trip plan including the defined work stops and the generated non-work stops,
wherein the set of non-work stops includes a set of fuel stops for inclusion in the trip plan generated based on at least one of current, historical, and estimated operating information for the vehicle,
wherein the trip planning tool generates a trip plan which includes the work stops and the set of fuel stops and any other stops in the set of non-work stops generated by the trip planning tool or added by the user of the transportation management system,
wherein the service generating the set of non-work stops further generates a set of alternate fuel stops for the trip plan based on at least one of the current, historical, and estimated operating information for the vehicle,
wherein the set of alternate stops is provided with the trip plan to the device operable by the remote operator or the vehicle driver for display in a GUI, and
wherein the trip planning tool modifies the trip plan to replace one of the fuel stops with one of the alternate fuel stops selected by the remote operator or the vehicle driver.

23. The system of claim 22, wherein the set of fuel stops is generated such that the set of fuel stops generated is the most efficient possible for the trip plan based on the needs or preferences of the user of the transportation management system.

24. The system of claim 22, wherein the set of alternate fuel stops is selected to match a set of preferences for fuel stops associated with the user of the transportation management system.

25. The system of claim 24, wherein the set of alternate fuel stops is selected to match a set of preferences for fuel stops associated with the remote operator or the vehicle driver.

26. A transportation management system for generating or managing trip plans for one or more vehicles, comprising;
a trip planning tool, running on one or more computing devices, defining a set of work stops for a vehicle;
one or more devices associated with the vehicle that is operable by a driver or a remote operator or that is self-driving;
a service generating a set of non-work stops for inclusion in the trip plan based on at least one of operating data for the vehicle, hours of service for the driver or the remote operator, and needs or preferences of a user of the transportation management system; and
a service generating a trip plan including the defined work stops and the generated non-work stops,
wherein the set of non-work stops includes a set of maintenance stops for inclusion in the trip plan selected based on at least one of current, historical, and estimated vehicle operating information and vehicle maintenance data,
wherein the trip planning tool generates a trip plan which includes the work stops and the set of maintenance stops and any other stops in the set of non-work stops generated by the trip planning tool or added by the user of the transportation management system,
wherein the service generating the set of maintenance stops further generates a set of alternate maintenance stops for the trip plan based on at least one of current, historical, and estimated vehicle operating information and vehicle maintenance data,
wherein the set of alternate stops is provided with the trip plan to the device operable by the remote operator or the vehicle driver for display in a GUI, and
wherein the trip planning tool modifies the trip plan to replace one of the maintenance stops with one of the alternate maintenance stops selected by the remote operator or the vehicle driver.

27. The system of claim 26, wherein the set of alternate maintenance stops is selected to match a set of preferences for maintenance stops associated with the user of the transportation management system.

28. The system of claim 27, wherein the set of alternate maintenance stops is selected to match a set of preferences for maintenance stops associated with the remote operator or the vehicle driver.

29. A transportation management system for generating or managing trip plans for one or more vehicles, comprising;
- a trip planning tool, running on one or more computing devices, defining a set of work stops for a vehicle;
- one or more devices associated with the vehicle that is operable by a driver or a remote operator or that is self-driving;
- a service generating a set of non-work stops for inclusion in the trip plan based on at least one of operating data for the vehicle, hours of service for the driver or the remote operator, and needs or preferences of a user of the transportation management system; and
- a service generating a trip plan including the defined work stops and the generated non-work stops,
- wherein the set of non-work stops includes a set of border crossing stops selected for inclusion in the trip plan based on planned or alternate route paths,
- wherein the trip planning tool generates a trip plan which includes the work stops and the set of border crossing stops and any other stops in the set of non-work stops generated by the trip planning tool,
- wherein the service generating the set of border crossing stops further generates a set of alternate border crossing stops for the trip plan based on planned or alternate route paths,
- wherein the set of alternate stops are provided with the trip plan to the device operable by the remote operator or the vehicle driver for display in a GUI, and
- wherein the trip planning tool modifies the trip plan to replace one of the border crossing stops with one of the alternate border crossing stops selected by the remote operator or the vehicle driver.

30. The system of claim 29, wherein the set of alternate border crossing stops is selected to match a set of preferences for border crossing stops associated with the user of the transportation management system.

31. The system of claim 30, wherein the set of alternate border crossing stops is selected to match a set of preferences for border crossing stops associated with the remote operator or the vehicle driver.

32. A transportation management system for generating or managing trip plans for one or more vehicles, comprising;
- a trip planning tool, running on one or more computing devices, defining a set of work stops for a vehicle;
- one or more devices associated with the vehicle that is operable by a driver or a remote operator or that is self-driving;
- a service generating a set of non-work stops for inclusion in the trip plan based on at least one of operating data for the vehicle, hours of service for the driver or the remote operator, and needs or preferences of a user of the transportation management system;
- a service generating a trip plan including the defined work stops and the generated non-work stops; and
- a service calculating an estimated time of arrival (ETA) for the vehicle to each of the work stops and the non-work stops in the trip plan,
- wherein, in response to changes to the ETAs calculated for each of the work stops and the non-work stops in the trip plan, notifications are provided to the user of transportation management system or are provided to the device operable by the remote operator or the vehicle driver for display in a GUI.

33. The system of claim 32, wherein the ETAs are calculated based on a dwell time for the vehicle estimated for each of the work stops and the non-work stops in the trip plan.

34. The system of claim 33, wherein the ETAs are calculated based on a combination of predicted travel time between each sequential one of the work stops or the non-work stops in the trip plan and the estimated dwell time for the vehicle at each of the work stops and the non-work stops in the trip plan.

35. The system of claim 33, wherein the estimated dwell time of each of the work stops and non-work stops in the trip plan accounts for an appointment window for that stop such that the end of the estimated dwell time for that stop is a time later than the start of the appointment window plus the estimated dwell time.

36. The system of claim 32, wherein the service generating the ETAs calculates the ETAs based on updating vehicle location and time during execution of the trip plan.

37. A transportation management system for generating or managing trip plans for one or more vehicles, comprising;
- a trip planning tool, running on one or more computing devices, defining a set of work stops for a vehicle;
- one or more devices associated with the vehicle that is operable by a driver or a remote operator or that is self-driving;
- a service generating a set of non-work stops for inclusion in the trip plan based on at least one of operating data for the vehicle, hours of service for the driver or the remote operator, and needs or preferences of a user of the transportation management system; and
- a service generating a trip plan including the defined work stops and the generated non-work stops,
- wherein the trip plan with the work stops and the non-work stops is implemented in the navigation system for the vehicle and provided to the device operable by the remote operator or the vehicle driver for display in a GUI.

* * * * *